United States Patent

Carter et al.

[15] 3,648,239

[45] Mar. 7, 1972

[54] SYSTEM FOR TRANSLATING TO AND FROM SINGLE ERROR CORRECTION-DOUBLE ERROR DETECTION HAMMING CODE AND BYTE PARITY CODE

[72] Inventors: William C. Carter, Ridgefield, Conn.; Keith A. Duke, Wappinger Falls; Donald C. Jessep, Jr., Poundridge, both of N.Y.

[73] Assignee: International Business Machines Corporation, Armonk, N.Y.

[22] Filed: June 30, 1970

[21] Appl. No.: 51,302

[52] U.S. Cl. ....................340/146.1

[51] Int. Cl. ....................G08c 25/00, G06f 11/00

[58] Field of Search ....................340/146.1, 172.5, 347; 235/153

[56] References Cited

UNITED STATES PATENTS

| | | | |
|---|---|---|---|
| 2,552,629 | 5/1951 | Hamming et al. | 340/146.1 X |
| 3,163,848 | 12/1964 | Abramson | 340/146.1 |
| 3,478,313 | 11/1969 | Srinivasan | 340/146.1 |
| 3,492,641 | 1/1970 | Harmon | 340/146.1 |

*Primary Examiner*—Charles E. Atkinson

*Attorney*—Hanifin and Jancin and Roy R. Schlemmer, Jr.

[57] ABSTRACT

An SEC/DED error detection and data translation mechanism is described. By the use of unique circuit design features, the same logical circuitry is capable of automatically taking Hamming encoded data from memory and parity encoding same for transmission elsewhere in the system as well as forming the necessary syndromes for purposes of error detection and correction. The same circuitry is capable of receiving encoded data from elsewhere in the system, first checking for any parity error and, if parity is proper, will generate the necessary Hamming check bits for storing in the memory together with the data information. The disclosed circuitry, by means of the unique partitioning thereof, separates the error detection and correction functions. It also generates parity bits essentially in parallel with error detection after a memory read cycle with the result that the data is propagated through the correction circuitry only when a single data bit error is detected.

15 Claims, 24 Drawing Figures

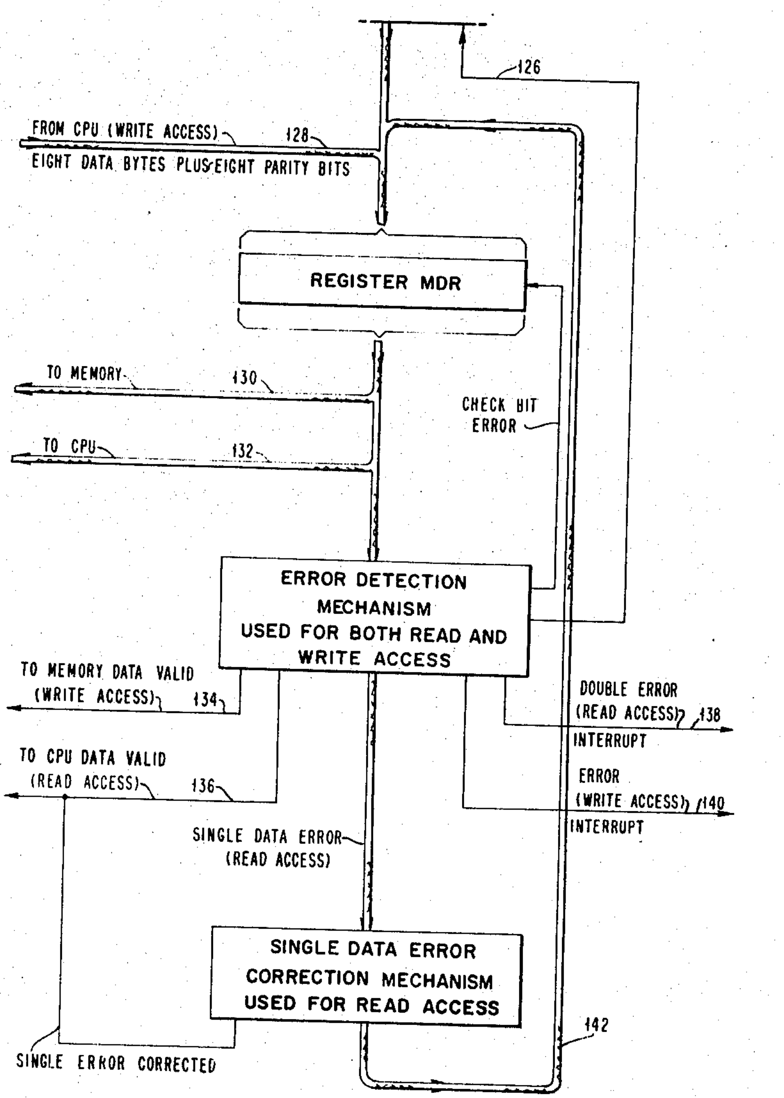
126
FROM CPU (WRITE ACCESS)
128
EIGHT DATA BYTES PLUS EIGHT PARITY BITS
REGISTER MDR
TO MEMORY
130
TO CPU
132
CHECK BIT
ERROR
ERROR DETECTION
MECHANISM
USED FOR BOTH READ AND
WRITE ACCESS
TO MEMORY DATA VALID
(WRITE ACCESS)
134
TO CPU DATA VALID
(READ ACCESS)
136
DOUBLE ERROR
(READ ACCESS)
138
INTERRUPT
ERROR
(WRITE ACCESS)
140
INTERRUPT
SINGLE DATA ERROR
(READ ACCESS)
SINGLE DATA ERROR
CORRECTION MECHANISM
USED FOR READ ACCESS
142
SINGLE ERROR CORRECTED

INVENTORS
WILLIAM C. CARTER
KEITH A. DUKE
DONALD C. JESSEP, JR.
BY
ATTORNEY

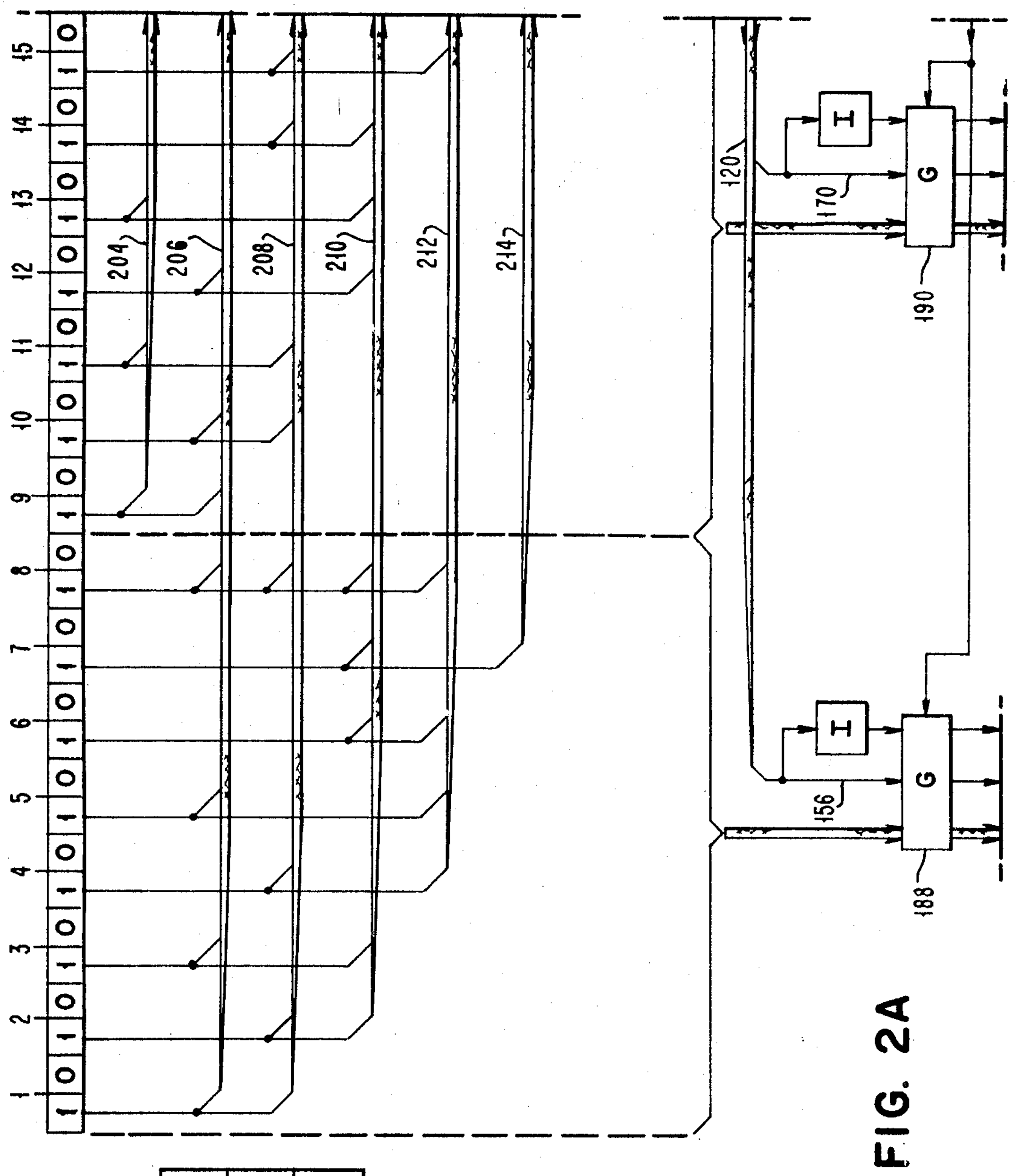
FIG. 2A
FIG. 2
| | | | |
|---|---|---|---|
| FIG. 2A | FIG. 2B | FIG. 2C | FIG. 2D |
| FIG. 2E | FIG. 2F | FIG. 2G | FIG. 2H |
| | | FIG. 2I | FIG. 2J |
FIG. 12
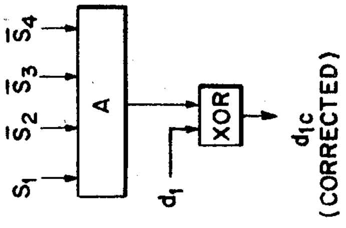

WRITE ACCESS

READ ACCESS

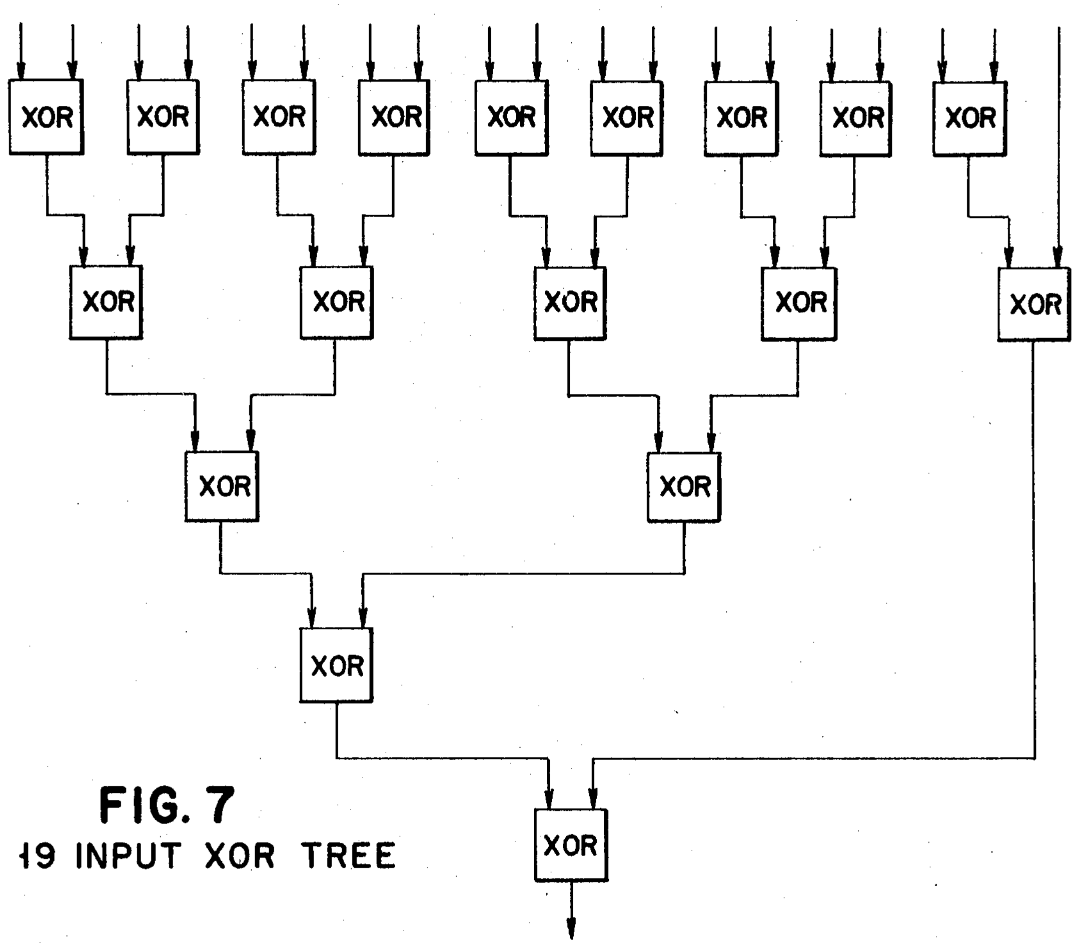
FIG. 7
19 INPUT XOR TREE
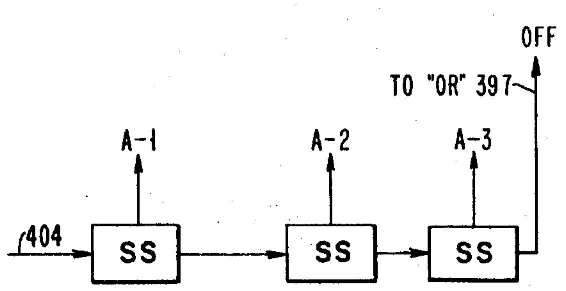
FIG. 8
"A" CLOCK
| | 1 | 2 | 3 | 4 | 5 | 6 | 7 | 8 |
|---|---|---|---|---|---|---|---|---|
| 1 | 1 | 1 | 1 | 1 | 1 | 1 | 1 | 1 |
| 2 | 1 | | 1 | | 1 | | | 1 |
| 3 | 1 | 1 | | 1 | | | | 1 |
| 4 | | 1 | 1 | | | 1 | 1 | 1 |
| 5 | | | | 1 | 1 | 1 | | 1 |
| 6 | | | | | | | 1 | |
| 7 | | | | | | | | |
| 8 | | | | | | | | |
FIG. 9

SYSTEM FOR TRANSLATING TO AND FROM SINGLE ERROR CORRECTION-DOUBLE ERROR DETECTION HAMMING CODE AND BYTE PARITY CODE

BACKGROUND OF THE INVENTION

For many years the computer industry has relied upon on the now familiar three dimensional random access magnetic core type of memory as its high speed working storage. Inherent with these memories and their manufacturing processes was a high degree of reliability. In other words, it would be very rare for a core memory to come out of the manufacturing process that was not essentially 100 percent usable. This is due to a number of factors. The primary factor is that each individual bit storage location or core is separately testable before it is assembled into the final memory.

Thus, individual bit failures in magnetic core memories are somewhat unusual. The type of failures that normally occur in this sort of a memory will affect a complete plane row or column of the memory due usually to some wiring or driver breakdown. This obviously necessitates a complete manufacture or fix of the memory.

However, with the advent of newer extremely high speed solid state memories generally referred to as the large scale integrated circuit memories, it is not normally possible to inspect individual bit storage locations as they are generally made on either a plane or a complete three dimensional entity basis. Thus it is intrinsic in the manufacturing process that such a memory can normally not be tested until it is completely fabricated and assembled. It is accordingly not possible to monitor the manufacturing process of such memories on a step by step basis but the final testing must literally be delayed until well along in the manufacturing process. That is to say that it is not possible to cast out individual bit storage locations. It may thus be readily seen that it is desirable to have some way of tolerating a certain percentage of failure in this type of a memory. One way of avoiding bad storage locations is of course mapping around said storage locations as is well known but this requires great amounts of hardware and programming effort on the part of the overall system supervisor in assigning storage locations to tasks. However, this is the technique that must be resorted to in the case of massive errors in such a memory where a large section is rendered unusable. However, another possible way of avoiding, for example, errors in a memory word is the use of error correcting codes such as those of Hamming wherein extra bits are provided with a data word and by logically combining the data bits with the extra or check bits. It may be determined whether or not a data word read out is erroneous and if the errors detected can be corrected within the capabilities of the code. The coding techniques of Hamming have been known and used widely in the communications industry for many years. However, such error detection and correction has seen rather limited use in the computer field due to the expense both in terms of providing extra bit storage in the computer memories and also in the rather large quantities of additional logical circuitry which has been necessary in the past to effect the necessary error detection and correction.

It should be noted that in a computer system when data is being transferred from the various portions of the computer such as the various short term registers, computational circuits, etc., parity checking is used to check for the correctness of data. Whenever a parity error is detected, a signal is provided and a retry or retransmission of the data is called for and in the great majority of cases, this will provide correct information. However, in the case of memories, where an error is normally not due to circuit transients as in the former case, parity checking would obviously provide an error indication but since most memory failures are hard failures, there is no way of identifying the exact bit failure location with parity checking techniques. It is for the reasons that some error correcting code such as Hamming codes must be utilized if some form of error correction is to be obtained. However, as stated before the majority of error correction schemes known in the computer industry have required excessive and expensive quantities of logical circuitry. Also, in most prior art schemes separate parity generators had to be used in addition to the error detection and correction circuitry to parity and code data being transmitted from a memory to some other location in the system. Additionally, Hamming encoding circuitry had to be provided to generate the necessary error correcting check bits to be stored in memory with each new data word being written therein. Thus, it may readily been seen that the provision of both error detection and correction circuitry plus the various parity encoding and decoding circuits totally comprise large quantities of logical circuitry which in the past have all been separate units.

For the previously stated reasons, error detection and correction circuitry has been provided in the past only in extremely expensive, highly reliable computer systems where the user was willing to pay the high price necessary to obtain desired error detection and correction together with more conventional parity checking features both in the memory and elsewhere in the system.

SUMMARY AND OBJECTS

It has now been found that a very versatile error detection and data translation circuit may be provided for use with computer storage elements or memories and which is especially adaptable for use with large scale integrated memories wherein the features of error detection and correction may be combined with parity checking and error generation in a set of highly versatile multifunction circuits. The circuitry of the present invention performs both a data translation function and an error detection and correction function. By data translation is meant converting from parity encoded data into Hamming coded or check bit coded data on a memory write cycle. Conversely, check bit coded data is converted by the same circuitry into parity encoded data on a memory read cycle. In addition, essentially in parallel with the parity encoding operation error detection is accomplished. While a certain amount of additional circuitry is obviously required to accomplish these functions, the circuit duality or multifunction capabilities keep the total amount of circuitry well below what has been utilized in the past wherein separate circuits had to be provided for each of the above-named functions.

It is thus a primary object of the present invention to provide a versatile multifunction error detection circuit.

It is a further object to provide such a circuit which produces the necessary syndrome bits for error correction when a single data error is detected.

It is a still further object to provide such a circuit capable of transforming from a parity encoded data format to a single error correction-double error detection (SEC/DED) coded data format.

It is yet another object of the invention to provide such a circuit also capable of transforming from a SEC/DED coded data format into a parity encoded data format.

It is another object to provide such a circuit capable of performing both said data transformations in essentially the same circuit elements.

It is a further object to provide such a circuit which signifies that a data word read from memory is error free and may be transferred to some other element of the computing system without passing through any correction circuitry.

It is a still further object to provide such a circuit which may selectively specify that a data word is error free, that a single error occurred in the check bits, that a single error is present in the data and a correction is required or that a double error has been detected and that no correction is possible.

It is yet another object to provide such a circuit which is capable of performing a parity check function prior to performing a memory write cycle.

The foregoing and other objects, features and advantages of the invention will be apparent from the following more particular description of a preferred embodiment of the invention, as illustrated in the accompanying drawings.

DESCRIPTION OF THE DRAWINGS

FIG. 2 is an organization drawing for FIGS. 2A–2J.

FIGS. 2A–2J comprise a combination functional and logical schematic diagram showing the essential features of a circuit embodying the principles of the present invention.

FIG. 7 comprises a logical schematic diagram of one of the 19 input EXCLUSIVE OR trees shown in FIG. 2D wherein each of said trees has 19 logical inputs.

FIG. 8 comprises a logical schematic diagram of the A-clock which controls the gating of the data and syndrome bits through the correction circuitry.

FIG. 9 comprises a parity check matrix.

FIG. 12 comprises a logic circuit for correcting an erroneous data bit.

DESCRIPTION OF THE DISCLOSED EMBODIMENT

Figures 1, 1A:
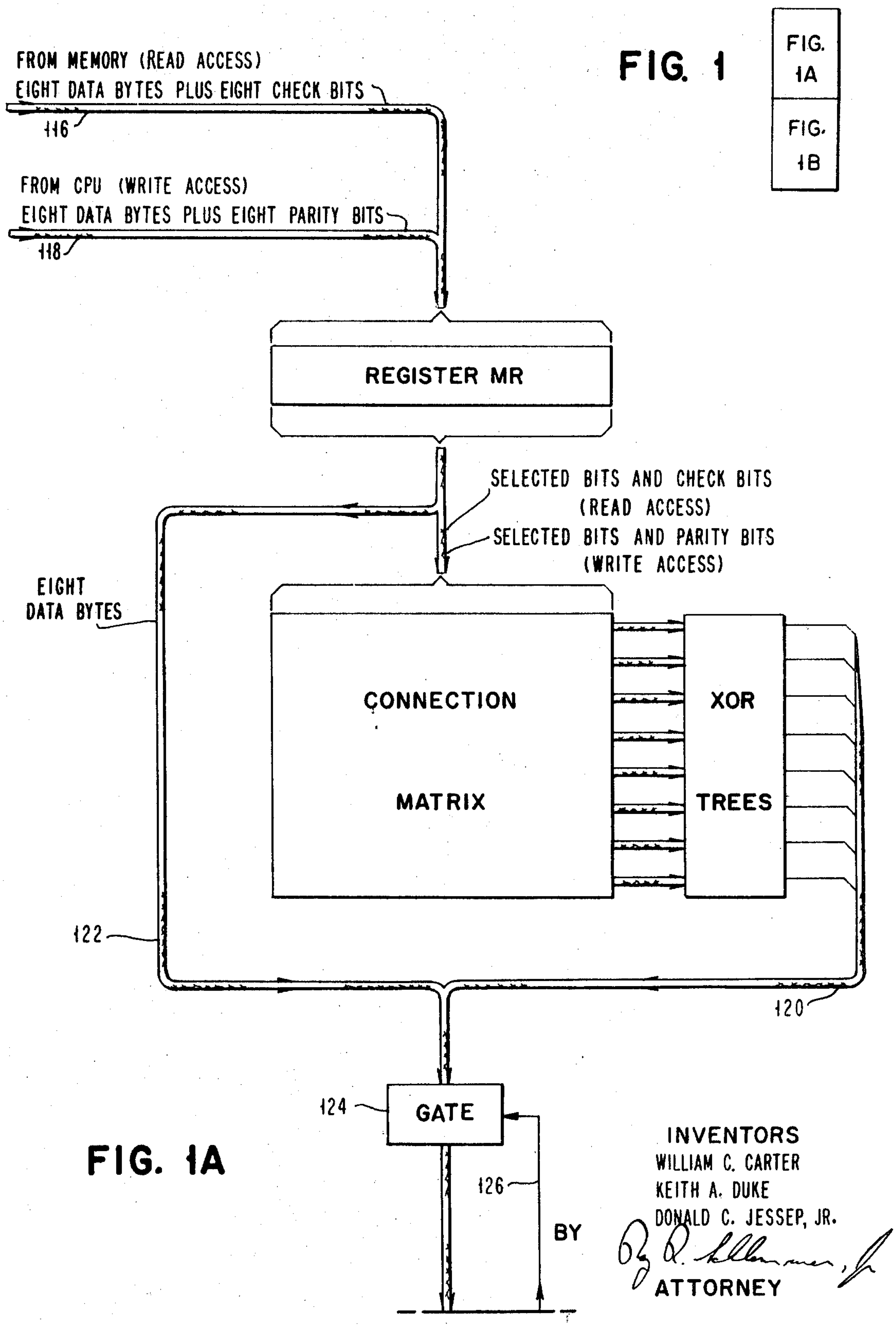
FIG. 1 is an organization layout of FIGS. 1A and 1B.
FIGS. 1A and 1B comprise a functional block diagram of the present error detection and data translation circuit showing the primary functional blocks and also the data flow within the system.

The objects of the present invention are accomplished in general by a system for translating to and from single error correction-double error detection Hamming code and byte parity code and for performing single error correction and double error detection on the data accompanying the Hamming code. The system comprises storage means for temporarily storing data and special purpose bits being read from or to be written into an associated memory means. The code conversion circuitry means is connected to said storage means for translating to and from SEC/DED Hamming code and byte parity code and for producing a different set of special purpose bits and placing same in said storage means. In the present specific embodiment, the storage means is shown to be two different sets of registers. However, as will be appreciated by one skilled in the art, appropriate timing means and gating means could be provided so that a single set of registers would suffice. Additional means is provided for generating parity across the original data bits and a selected set of special purpose bits. The results from said generating means are placed in a storage means. Finally, detection means responsive to said generating means is provided for indicating an error when a predetermined parity condition does not exist across said data bits and selected special purpose bits.

The output of said generating means comprises a set of additional bits, which in the case of a memory write cycle will be simple parity indicators and in the case of a memory read cycle will be syndrome bits for subsequent error detection and correction purposes. Additional circuitry is provided to distinguish between the situation of a check bit error, a single data .t error, a double data bit error, or a parity error depending upon the particular memory cycle being executed.

The significant feature of the present invention is the provision of the code conversion circuitry which is designed with a unique parity check matrix and Hamming code which allows said code conversion circuitry to generate check bits from parity bits and data bits and both syndrome and parity bits from check bits and data bits. Further, the design of the present system allows the generation of a number of these items substantially in parallel saving considerable time and execution while the dual function circuitry obviously saves large quantities of hardware.

The following general description of the theory of Hamming codes and then the further extension of this theory to the design of a dual purpose or dual function code translation circuit will clearly illustrate the basic principles of the present invention. Following this there is a discussion of the general architectural layout of the presently disclosed embodiment with reference to FIGS. 1 and 3–8 and finally the description of the operation of the specifically disclosed embodiment of FIGS. 2A through 2J explains the detailed operation of the present system on both a memory read and a memory write cycle and also generally describes the manner in which correction is performed by a typical Hamming code correction circuit.

FIG. 1 is a general block diagram of the present system illustrating the primary functional units thereof together with the general data flow. Referring to the figure, which is made up of FIGS. 1A and 1B, it will be noted that data is brought in from memory on cable 116 and comprises both the eight data bytes illustrated plus the eight Hamming code SEC/DED check bits. It will also be noted that this register may be loaded from the CPU but in this case will contain the eight data bytes plus eight byte parity bits. Cable 116 is used in a "read" access and cable 118 is used for a "write" access into the memory. It should be clearly understood that the eight data bytes of eight bits each plus the eight check bits or parity bits are chosen for purposes of the present embodiment. It should be understood that an appropriate number of check bits and parity bits would be provided depending upon the number and size of the data bytes. In the case of a read access, certain selected data bits and check bits are applied to an implementation of the parity check matrix, the Connection Matrix. In the case of a write access the same selected data bits and the parity bit are applied to the Connection Matrix. It will be noted that the output of the Connection Matrix extends through the EXCLUSIVE OR trees to the cable 120 which are then gated through gate 124 to the MDR Register. The output on cable 120 will comprise eight new bits and the actual data bits are transferred to the MDR Register via the cable 122. As stated previously in the case of a read access, the Connection Matrix and the EXCLUSIVE OR trees convert check bits to parity bits. While in the case of a write access, the same Connection Matrix and the EXCLUSIVE OR trees convert the parity bits to check bits. On a write access, the register MDR is loaded directly from the CPU and in this case, the work loaded into the MDR Register consists of the eight data bits plus the eight parity bits. As will be seen this information comes in over cable 128. It will be noted that on a write access that both the MR Register and the MDR Register are loaded directly from the CPU over cables 118 and 128 respectively. The reason for this is that it is first necessary to check the data coming from the CPU to see if it has proper parity or in other words to see if it is correct. If it is correct, then it is necessary to change the eight parity bits to eight check bits in order to store the word and memory in the proper SEC/DED Hamming codes. As stated previously, this is done by gating the MR Register through the Connection Matrix to the MDR Register where word is available to the memory via cable 130 in proper Hamming coded form.

Referring to FIG. 1, it will be noted that a block indicated as Error Detection Mechanism is attached to the output of the MDR Register. This block in essence contains dual function EXCLUSIVE OR circuitry for performing the parity check on a write access and for finally converting the parity encoded data appearing in the MDR Register on a read access to a final set of syndrome bits which are utilized to signal the type of error present, if any, and also utilized to perform single error correction.

As was explained previously in the theory of operation of the present system, the output of the Error Detection Mechanism on parity check will have to test the byte parity in each byte section of the MDR Register. Since odd parity is being used, as will be apparent, a simple AND circuit can perform this check. In the case of a read access the detection is somewhat more complex in that the circuitry must distinguish between a check bit error in which case it will be determined that the data is correct, a single data bit error which will imply that a correction algorithm must be initiated and a double error has been detected in which case the system must be interrupted and this fact made known, and finally that no error has been detected and that the data currently in the MDR register may be transferred to the CPU.

Finally, the block entitled Single Error Detection Mechanism makes corrective use of the generated syndrome bits produced by the Error Detection Mechanism in an essentially conventional manner as will be described in the subsequent description of FIG. 2. It should be understood that the disclosed correction circuitry is purely conventional and is generally described at many places in the available literature, such as 1) W. W. Peterson, *Error-Correction Codes*, the MIT Press, 1961, pp. 30–35; 2) I. S. Reed, "A Class of Multiple Error-Correcting Codes and the Decoding Scheme," Trans. IRE (PGIT), Vol. 4, 1954, pp. 38–49; or 3) P. Elias, "Coding for Noisy Channels," IRE Convention Record, part 4, 1955, pp. 37–45.

From the above general description of FIG. 1 the overall objects, features, and advantages of the system should be apparent. It will thus be seen that substantially the same circuitry is utilized on both memory read and memory write accesses for the purposes of code translation, parity checking, syndrome bit generation, etc. Contrasted to the methods previously utilized in the prior art, great savings in circuitry are accordingly realized.

Figure 4:
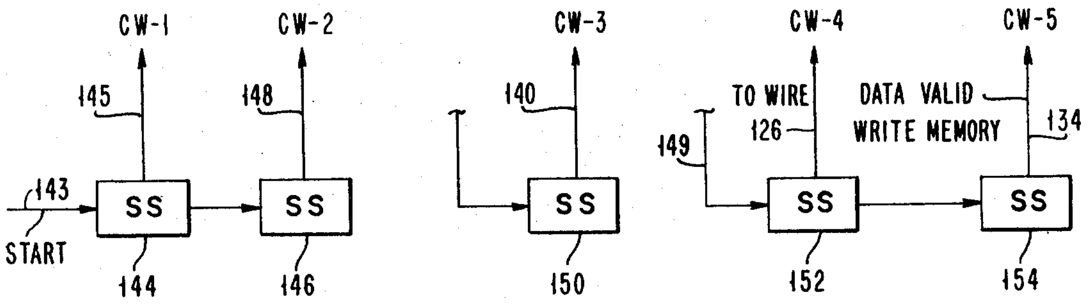
FIG. 4 comprises the CW clock which essentially controls operation of the system during a "write" memory cycle.

Before proceeding with the description with the detailed embodiment of FIG. 2, the following general description of FIGS. 3–8 will generally set forth the operations involved in both the "read" access and a "write" access. First the operation of a "write" access will be explained together with the flow chart shown on FIG. 3 and the single shot clock circuit shown on FIG. 4. The mechanism shown on FIG. 4 is for illustrative purposes only and represents one sort of timing arrangement that could be utilized with the present system. However, it is to be understood that other timing means could readily be employed. Any suitable pulse generator could be used. During a write access, a pulse is delivered to the Start line which starts the sequence of events. As shown in the flow chart of FIG. 3, the start pulse causes a box labeled "in gate register S." At this point, it should be noticed that above each block in FIG. 3 there is an indication of which step of the CW clock is involved in performing the particular step. It will also be noted that on FIG. 4 that a number of the inputs have reference numerals thereon indicating the source of some of the enabling pulses. It will be noted that these reference numerals are also the same reference numerals utilized on FIGS. 2A–2J and are utilized for purposes of convenient reference. It should be noted at the beginning of a write access that both the register MR and MDR are loaded with data and parity bits from the CPU. What the ingating to the register S does is to perform a parity check on the data currently in the MDR register. The next block turned on by CW-2 tests for an error. If the answer is no, the program branches to CW-4 and generates "check bits." The causes the data and parity bits stored in the register MR to be passed through the Connection Matrix and the EXCLUSIVE OR trees to automatically generate check bits and place the original data bits plus the newly generated check bits in the MDR register. CW-5 sends valid data to memory and then branches to the end. If after CW-2 there had been an error indication, the next step would have initiated clock step CW-3 and would have caused a "interrupt." This interrupt would be a conventional interrupt and might cause a retransmission or some other diagnostic or error routine in the system. However, since this is a parity error, there is no possibility of correcting same and it will be apparent that the data could not be stored in memory in the obviously incorrect form. This completes the description of the rudimentary steps of a "write" access.

Figure 5:
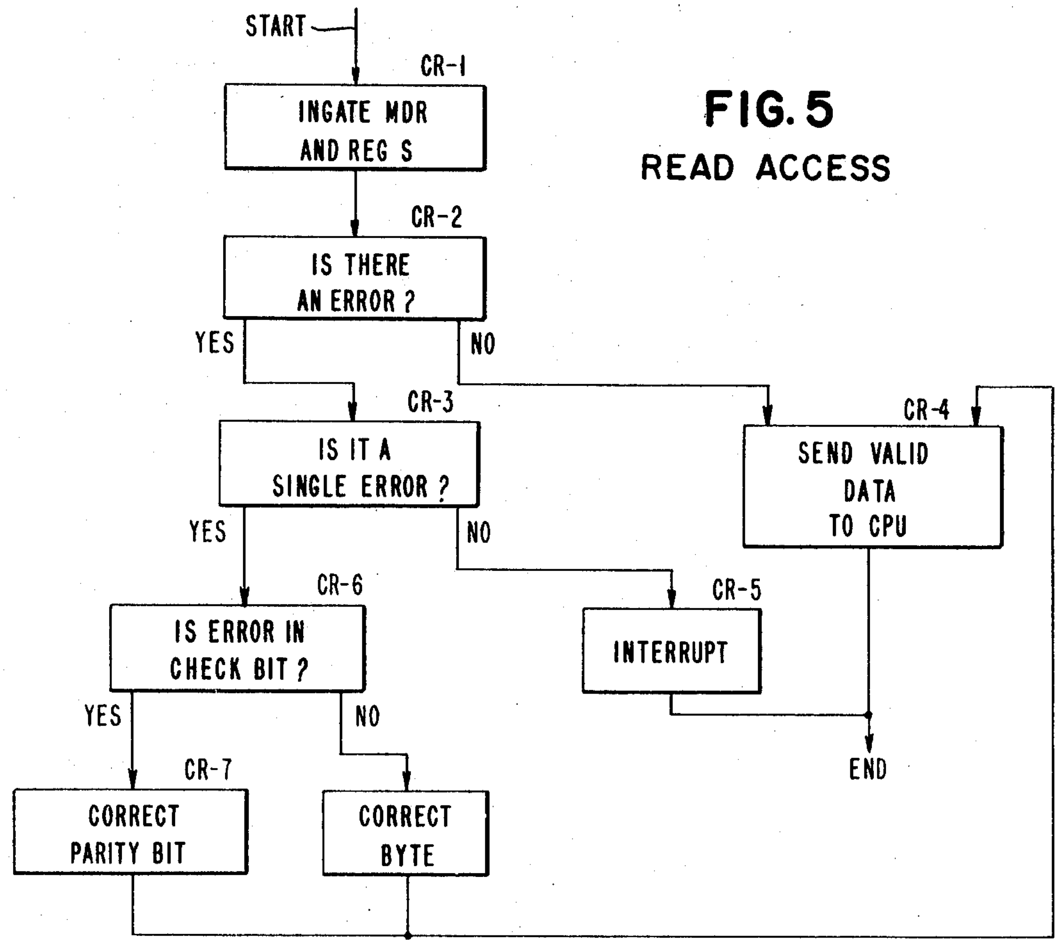
FIG. 5 is a flow chart of the operation of the present system during a memory "read" access.
Figure 6:
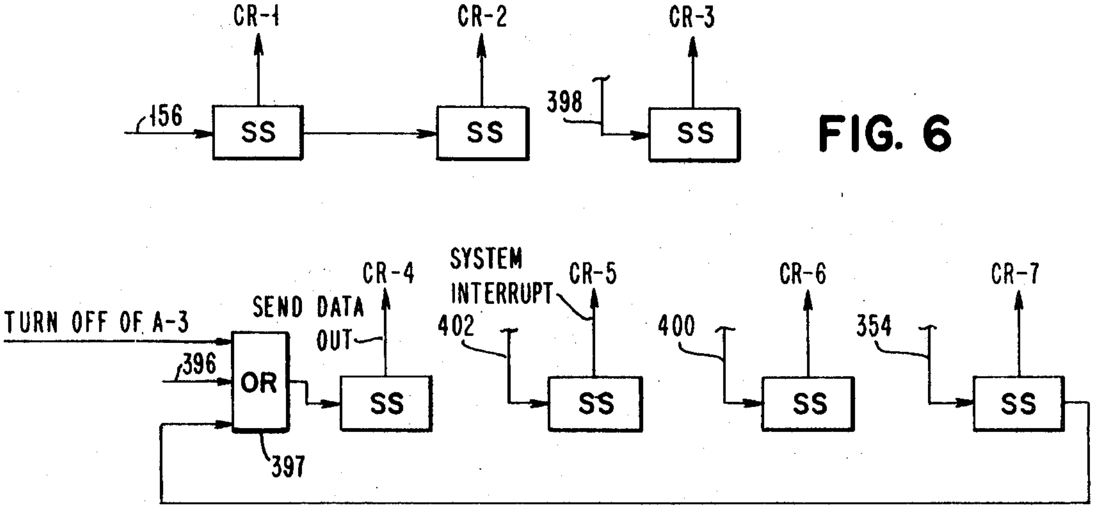
FIG. 6 is a diagram of the CR clock which con,rols the system during a memory "read" cycle.

Referring now to FIGS. 5 and 6, a "read" access will be described. FIGS. 5 and 6 are laid out identically to FIGS. 3 and 4 wherein FIG. 5 is a flow chart wherein individual clock steps, i.e., the CR clock shown in FIG. 6 is tied in to the various individual operations set forth in FIG. 5. Again the specific embodiment of the clock of FIG. 6 is not fixed in that the timing sequences could be performed by other circuitry than the indicated single shots. Again the reference numerals, principally the line references shown turning on the various single shot stages, are the same reference numerals utilized on FIGS. 2A–2J. The start line at the top of the FIG. 5 initiates the first block "ingate MDR Register and Register S." Since this is a memory read cycle, the MDR Register will be loaded with data bits plus the parity bits generated by the Connection Matrix. And subsequently passing the contents of the MDR Register through the Associated EXCLUSIVE OR circuits converts this information to the syndrome bits as explained previously and stored same in the Register S.

CR-2 asks the question "Is there an error?" by testing the contents of the register S as described previously. As will be remembered, there are four possible conditions which can occur. The first is no error, the second is a check bit error, the third is a single data error and the fourth is a double error. If there is no error, the system branches to CR-4 which provides a signal "valid data to COU" and ends this clock routine. If there is an error, the system branches to clock pulse CR-3 and the test is made to determine "Is it a single error?" If the answer to this test is no, a double error is implied and the system branches to CR-5 and an "interrupt" is generated which cause the end of this clock. If the error is single, the system branches to CR-6 which makes the test "Is the error in the checking bit?" If yes, the system branches to CR-7 which will cause one of the previously generated parity bits to be corrected. If the error is not in the check bit, the system branches to the block designated "Correct byte" and this is designated by line 404 proceeding to the clock state A-1 which initiates the single data bit correction step. After both the parity bit and the data bit correction, the system will then branch back to the clock step CR-4 which causes the now valid data to be sent to the CPU or elsewhere in the system after which the read access will have been completed. The A Clock just mentioned is on FIG. 8 and as will be noted comprises a very simple three stage clock, which as will be apparent from the subsequent description of FIGS. 2A–2J, are the only stages that are necessary since when a correction is necessary the entire data word together with the appropriate syndrome bits are read in parallel into the correction circuitry and reread in parallel back into the MR Register and thence into the MDR Register with corrected parity bits.

Figure 2B:
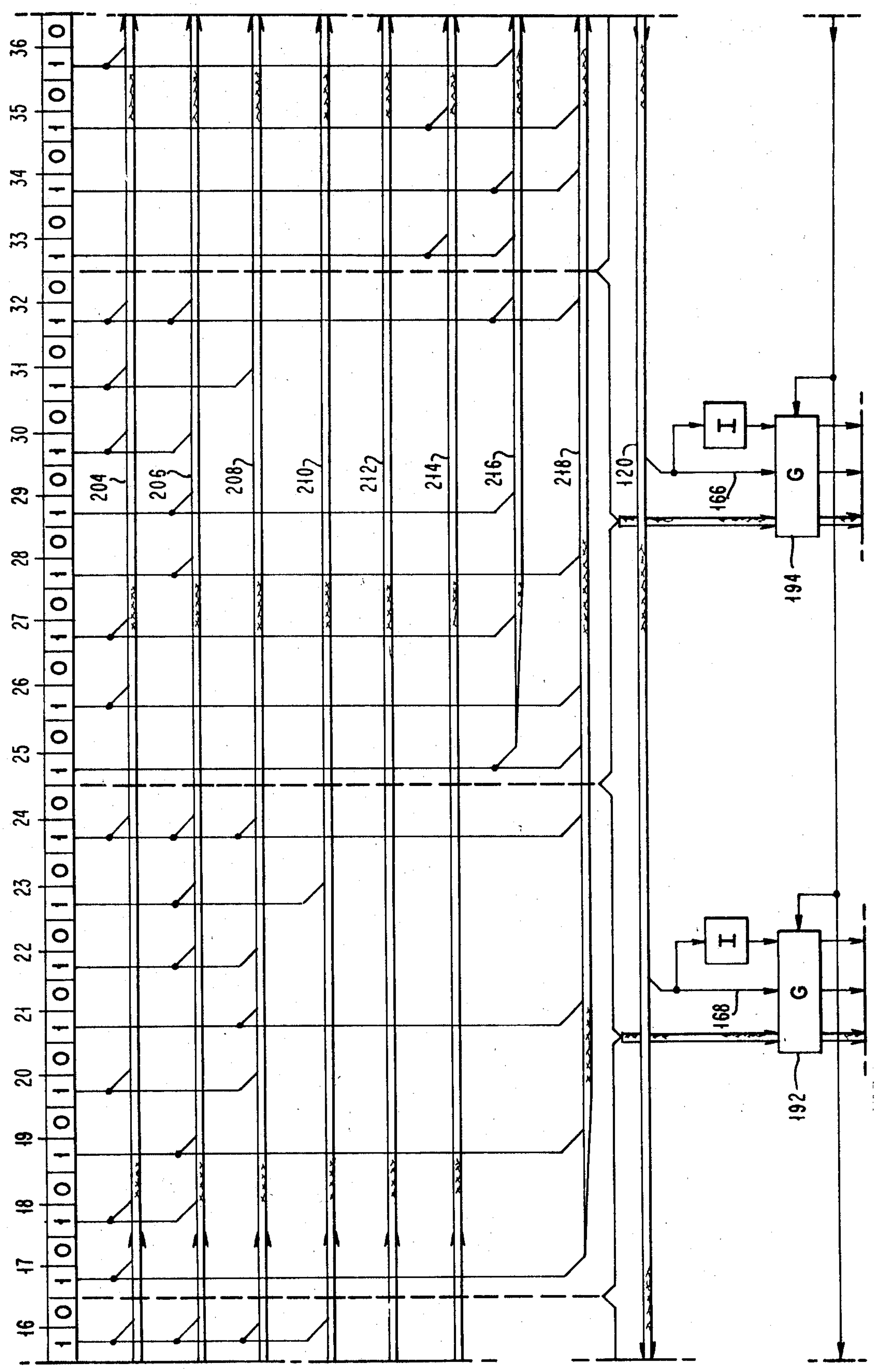
Figure 2C:
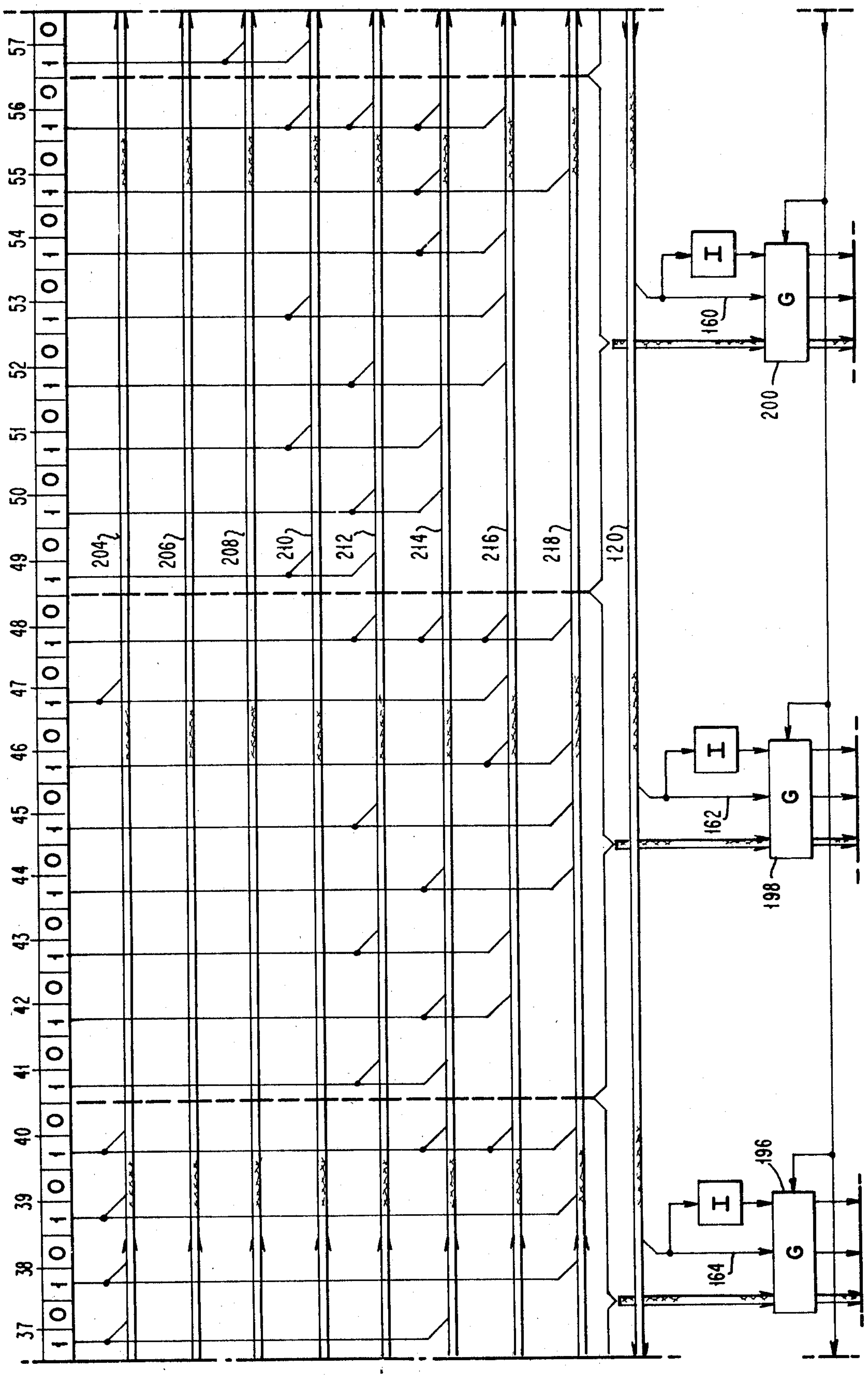
Figure 2D:
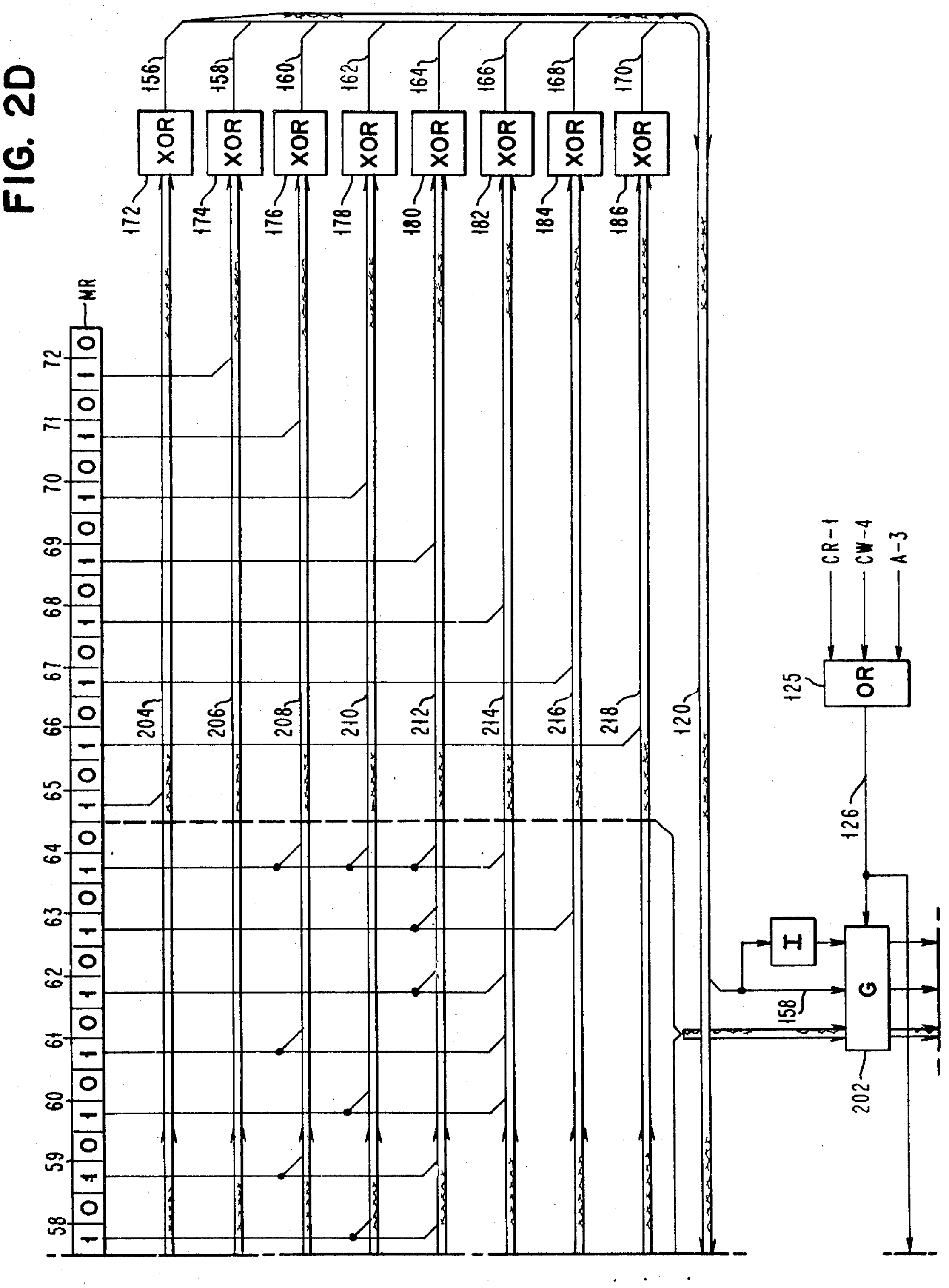
Figure 2E:
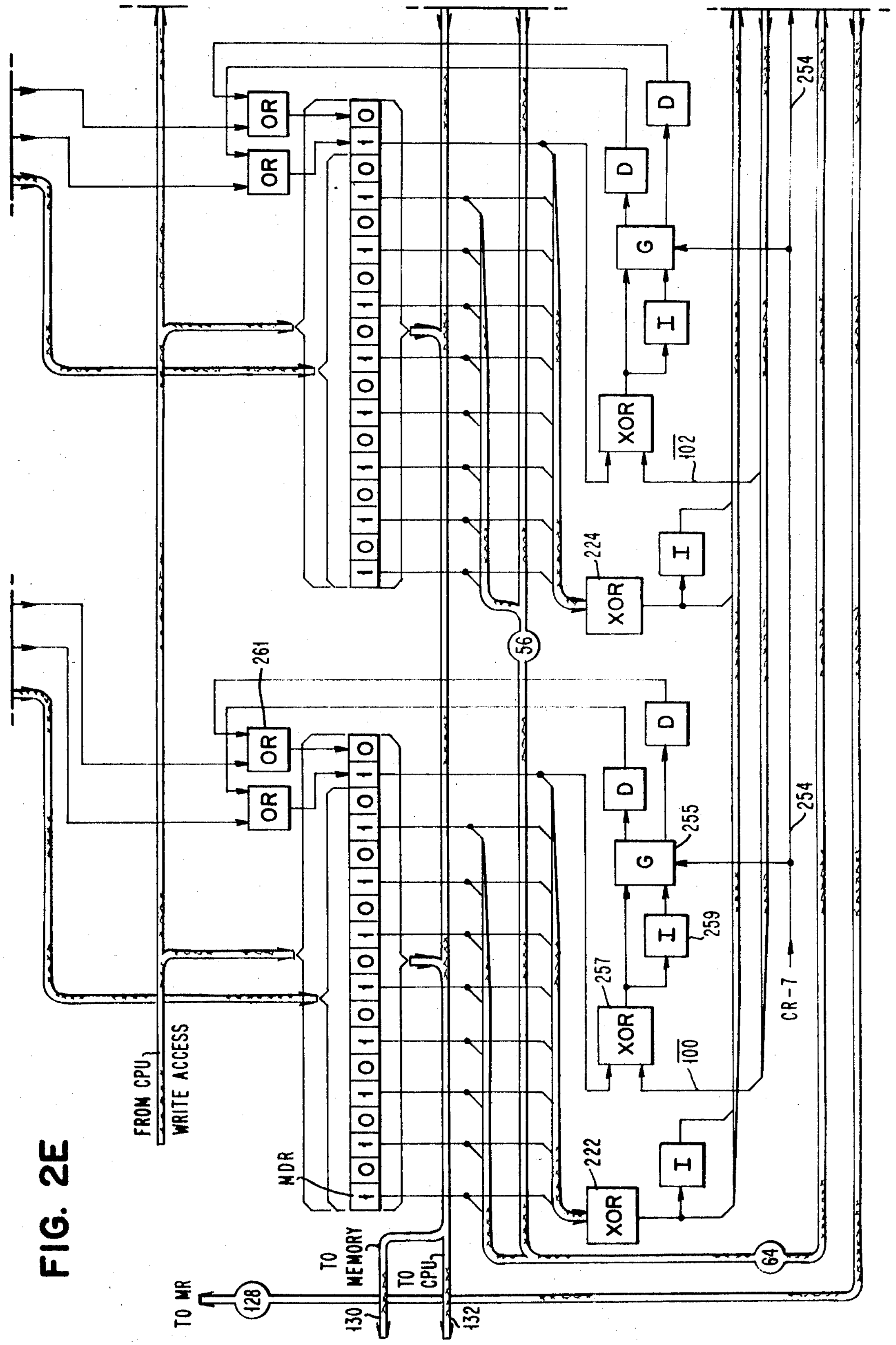
Figure 2F:
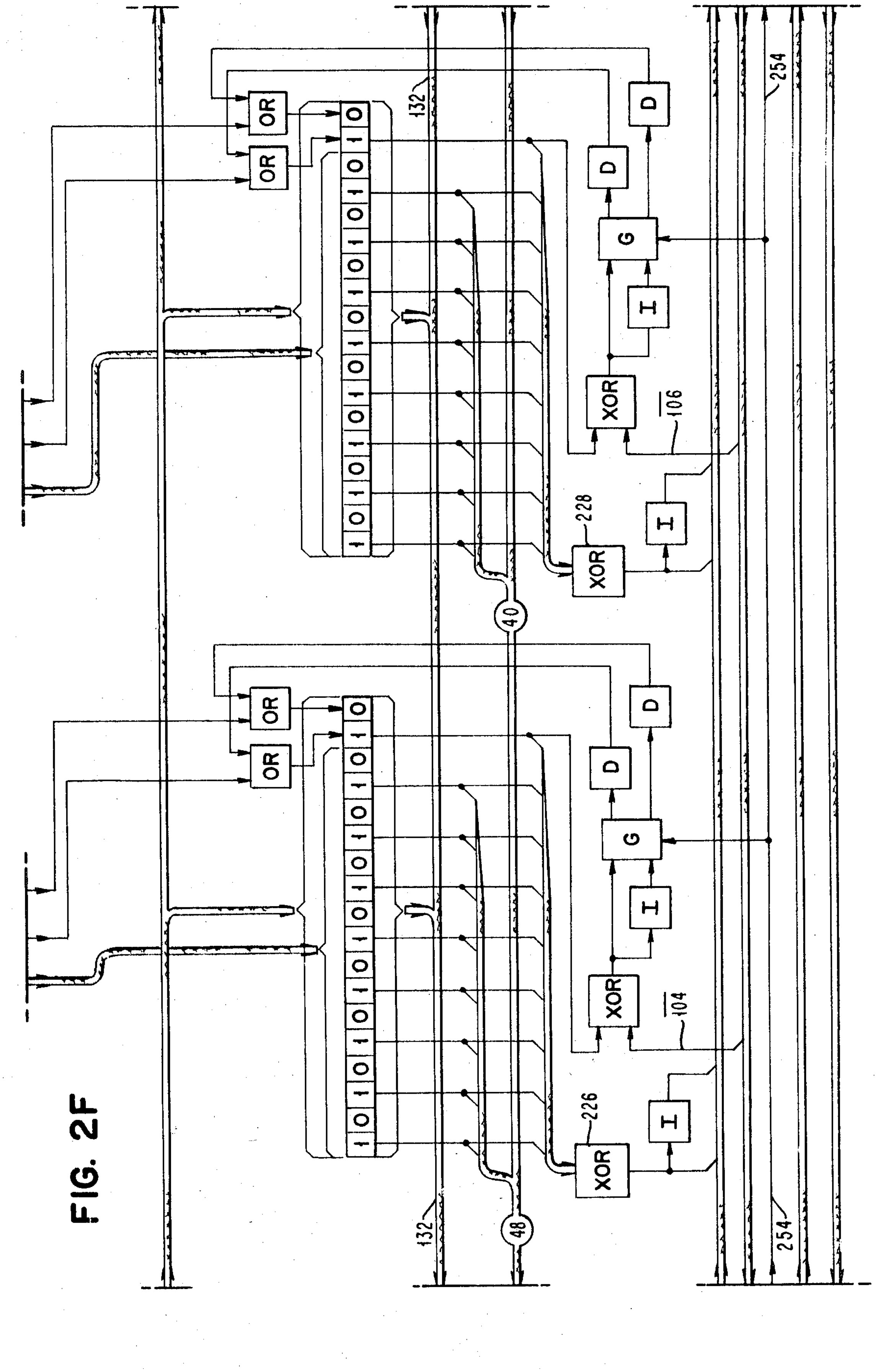
Figure 2G:
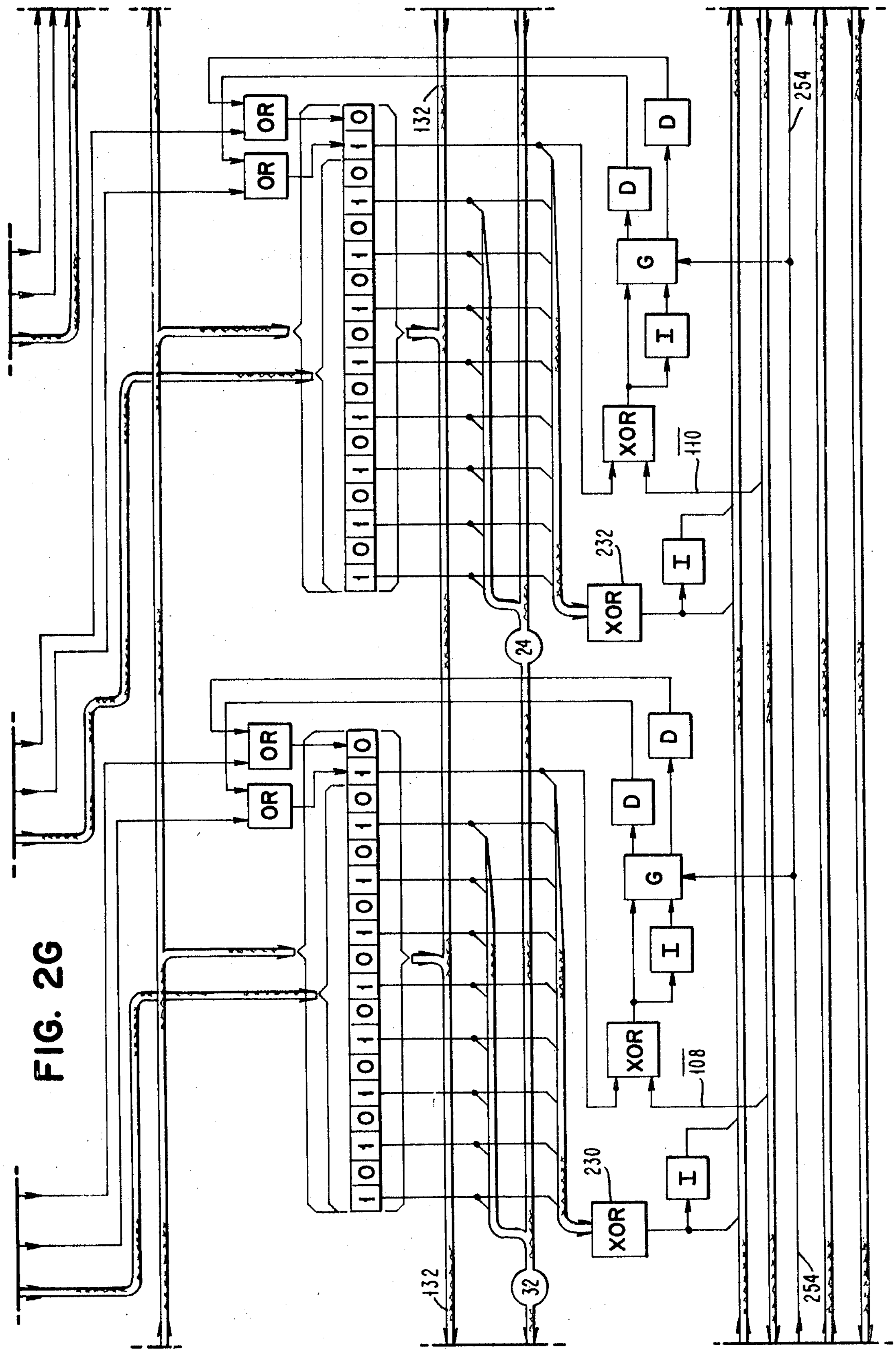
Figure 2H:
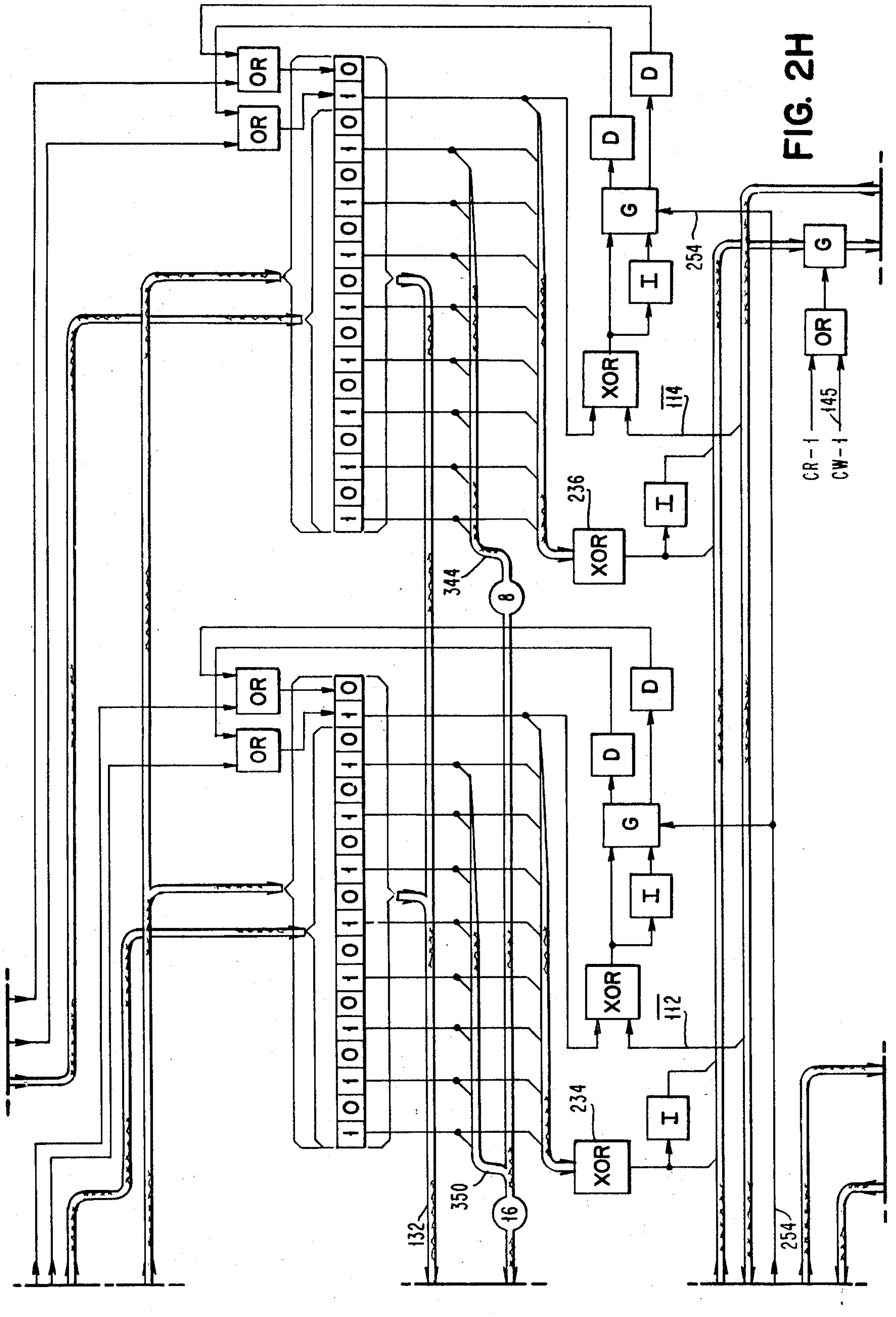

FIG. 7 is a detailed logical schematic diagram of one of the EXCLUSIVE OR trees shown on FIGS. 2D and also on FIG. 1A. As discussed in detail with respect to FIGS. 2A–2J each of these EXCLUSIVE OR trees has 19 inputs and a single output. The operation of the EXCLUSIVE OR circuit is believed to be quite well known in the art it being apparent that an odd number of ones coming on the input lines will produce odd parity or a 1 on the output line.

Figure 2I:
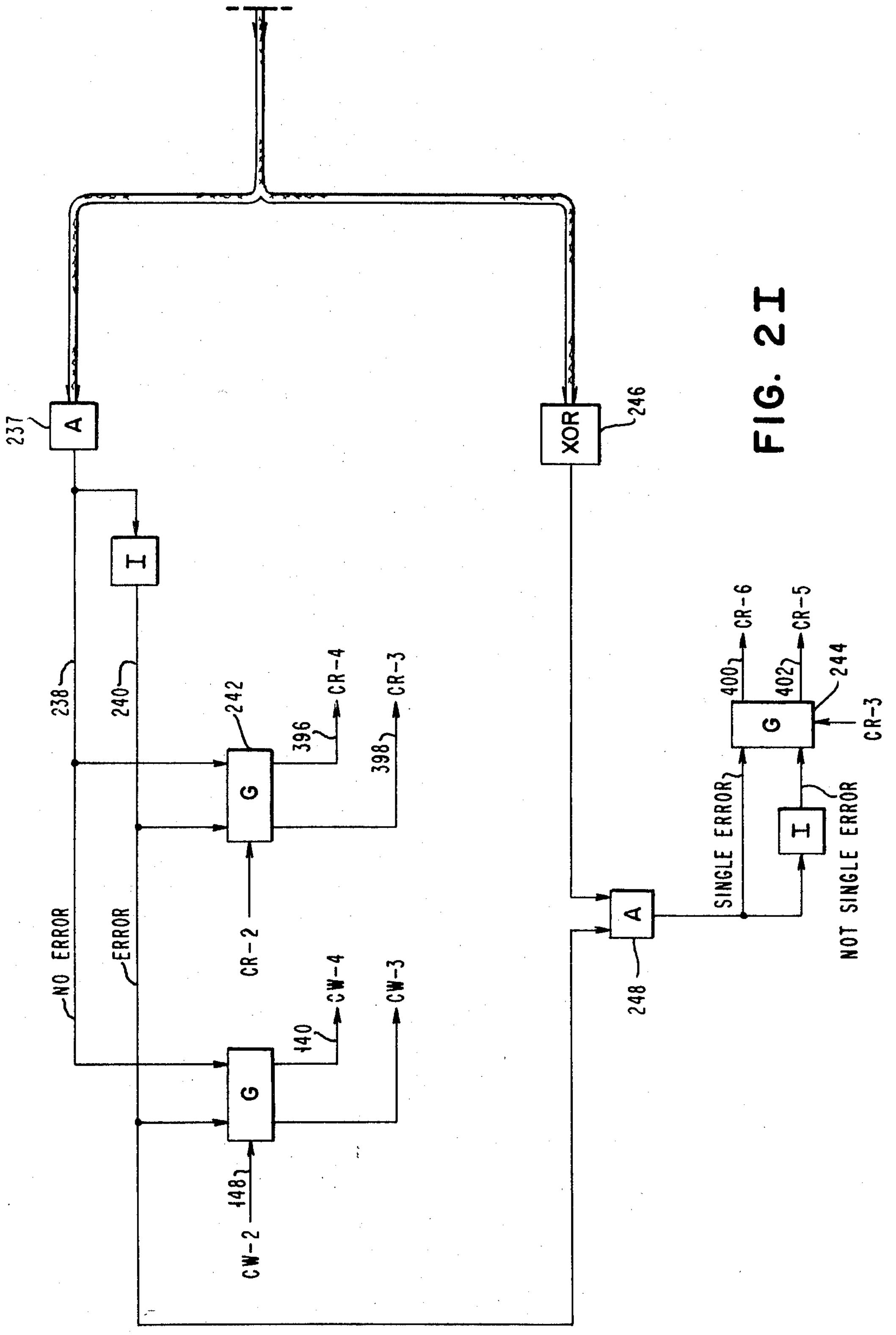
Figure 2J:
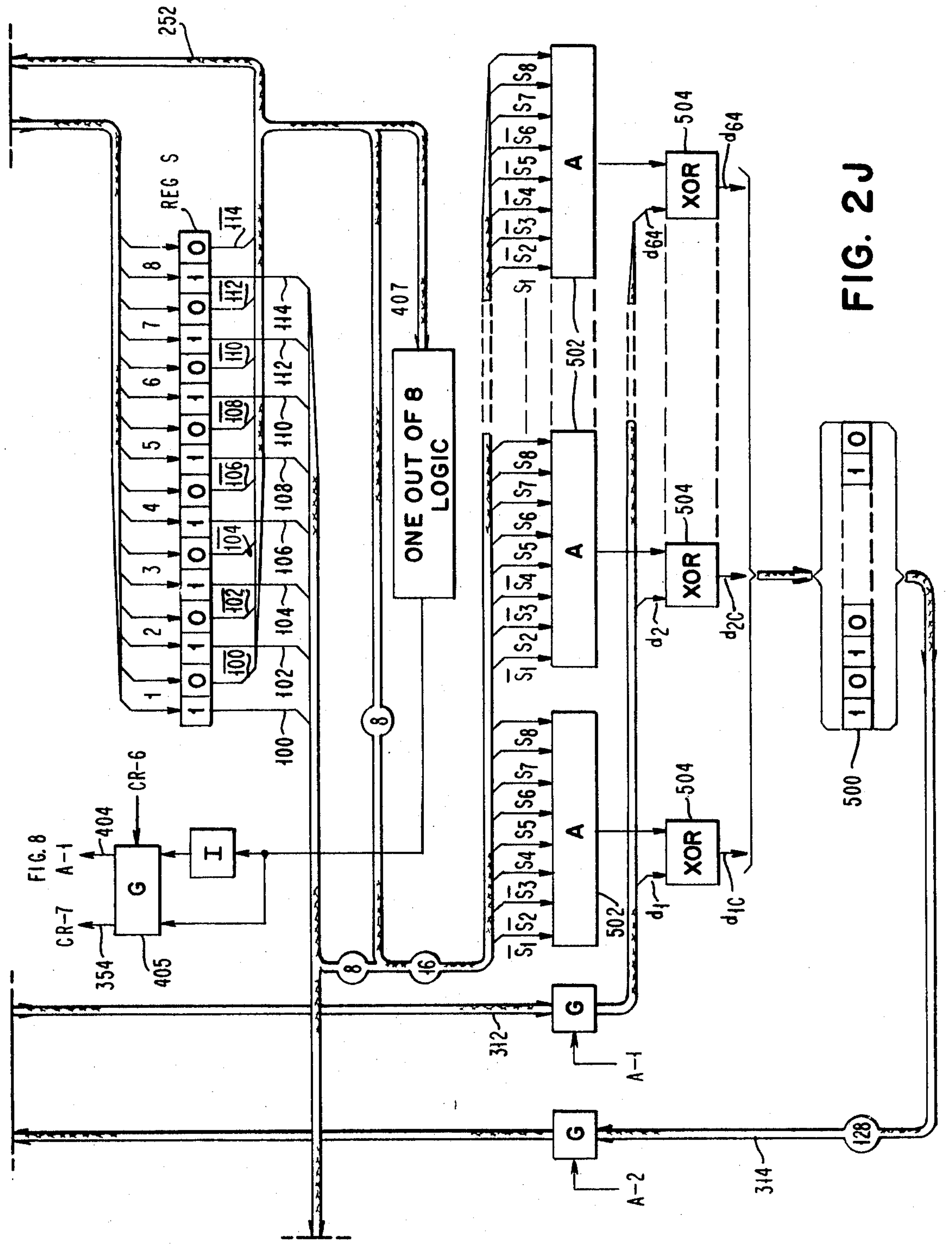
Figure 3:
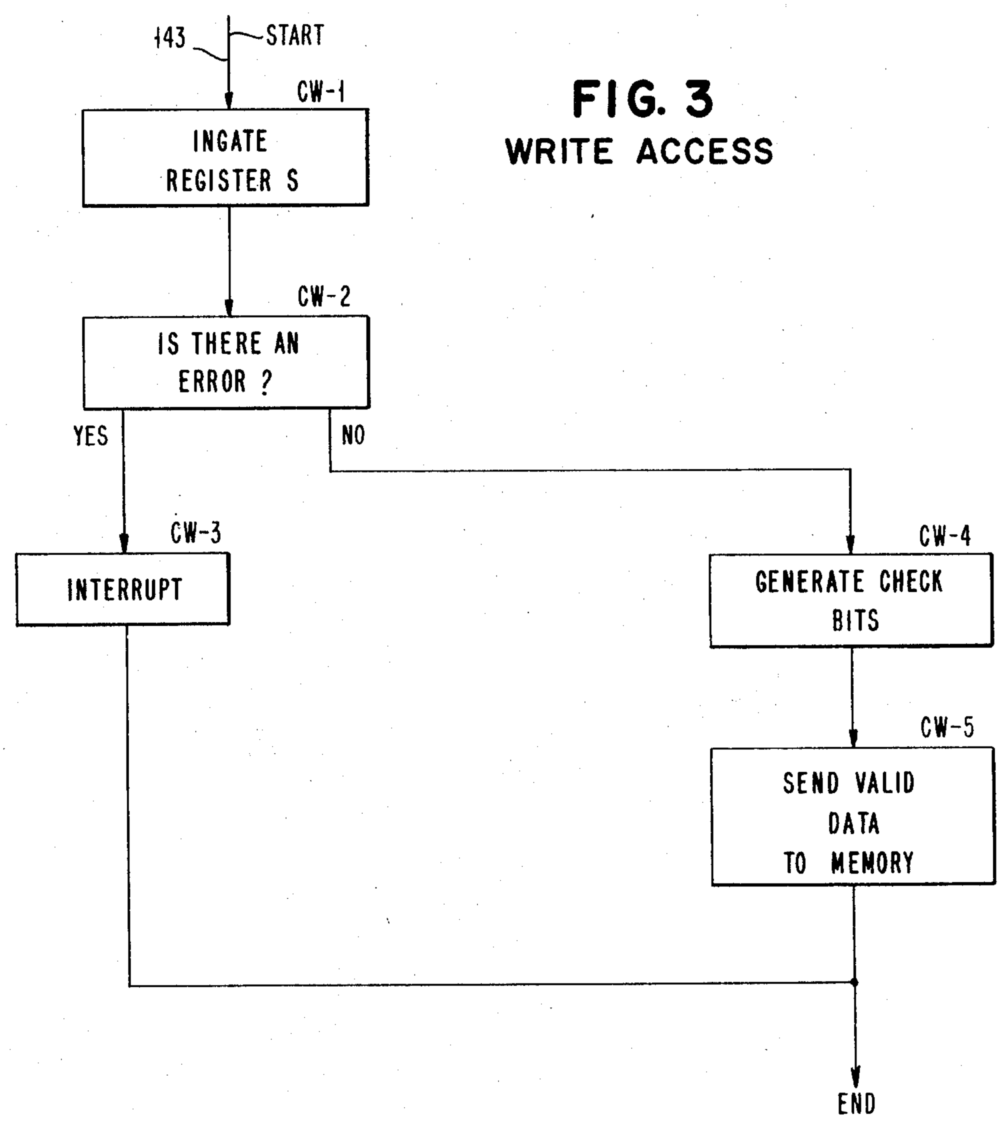
FIG. 3 comprises a flow chart of the operations occurring in the present system on a memory "write" access.

FIG. 8 shows the A-clock which in effect controls the correction circuitry shown principally on FIG. 2J. This clock is configured in substantially the same way as the CR-clock and CW-clock being composed of a plurality (3) of single shots the turn on of which produces a particular clock pulse and the turn off of which may either go to the end of the step or continue to the next single shot depending upon the particular routine in progress. In any event the operation of this clock and the correction circuitry will be described in detail with respect to the description of the embodiment disclosed in FIGS. 2A–2J.

The following explanation is intentionally not rigorously algorithmic. It is for a general understanding available by a casual reading.

General Theory of Operation of the SEC/DED Translator

The operation of the Translator (so-called because it can generate check bits from parity bits or, conversely, parity bits from check bits, depending on whether the memory is being written into or read from, it being understood that the data bits are also involved in the translation) is predicated on the "-parity-check matrix." The parity check matrix has been previously treated in the literature by W. W. Peterson, *Error-Correction Codes*, the MIT Press, 1961, pp. 30–35. Although its foundations were properly laid in the early classic paper by R. W. Hamming, "Error Detecting and Error Correcting Codes," The Bell System Technical Journal, Vol. XXVI, No. 2, Apr. 1950, pp. 147–160.

Let us treat a simple example of a conventional use of the parity check matrix as it is found in the implementation of a rudimentary communications system. The communications system, will be assumed to consist of a transmitter of binary signals, a receiver of the same, and a channel, denoted by "C." The channel will be considered to be inherently much more unreliable than either the transmitter or receiver circuitry. Hence, the channel will be subjected to disturbances which can logically complement a transmitted bit; i.e., a "1" will be transmitted and received as a "0" or a "1" received for a transmitted "0."

This is directly analogous to the situation of a memory in which the transmitter has, as its analogue, the memory "write" circuitry and the receiver has, as its analogue, the memory "read" circuitry.

Consider next the use of a Single-Error-Correcting/Double-Error-Detecting Code (SEC/DED Code) for this situation. A word (a set of bits) will be encoded, transmitted, checked with subsequent correction or detection within SEC/DED capabilities of the code, and, in decoded form, presented at the output of the receiver. The code will be prescribed by a parity check matrix H as given below.

$$H = \begin{matrix} 0 & 1 & 1 & 1 & 1 & 0 & 0 & 0 \\ 1 & 0 & 1 & 1 & 0 & 1 & 0 & 0 \\ 1 & 1 & 0 & 1 & 0 & 0 & 1 & 0 \\ 1 & 1 & 1 & 0 & 0 & 0 & 0 & 1 \end{matrix}$$

For this matrix, each column "corresponds," respectively, to the data bits $d_1$, $d_2$, $d_3$, $d_4$, and the check bits $c_1$, $c_2$, $c_3$, $c_4$. The verb "corresponds" appears in quotation marks here to emphasize that the correspondence is between a "1" in a given row and the appearance of the data or check bit associated with the column in the parity equation for that row. Thus, we are illustrating that an error can be located (and corrected) if we selectively take the parity of several subsets of the data bits, and further, if we can observe which of these parity bits are in a logic state opposite to the state of their "no-error" values. This is because we know the patterns of these parity bits for each correct and incorrect value of every data bits.

The question now is, "how does the parity check matrix determine the parity bits and permit error location?" The answer to this must be drawn from another "correspondence" —that of the parity bits, or syndromes as they are clinically referred to, to the individual rows of the parity check matrix. To answer the question above, then, let us write the parity equations prescribed by the parity check matrix.

First row: 0 1 1 1 1 0 0 0 (↓ each)

First eqtn.: $0.d_1 + 01.d_2 \oplus 1.d_3 \oplus 1.d_4 \oplus 1.c_1 \oplus 0.c_2 \oplus 0.c_3 \oplus 0.c_4 = S_1$ or $d_2 \oplus d_3 \oplus d_4 \oplus c_1 = S_1$, where $S_1$ is the syndrome for row 1.

The check bit $c_1$ is *chosen* so that $S_1 = 1$ for the "no-error" case in odd parity. The other three equations are:

Second row: $d_1 \oplus d_3 \oplus d_4 \oplus c_2 = S_2$

Third row: $d_1 \oplus d_2 \oplus d_4 \oplus c_3 = S_3$

Fourth row: $d_1 \oplus d_2 \oplus d_3 \oplus c_4 = S_4$ and $S_1=S_2=S_3=S_4=1$ will denote the "no-error" condition for odd parity. Thus, the explanation as to how an error is located is now possible in terms of the equations above. It can be seen that $d_1$ only appears in the parity (syndrome) equations for rows 2, 3, and 4. As such, $d_1$ is the only bit that, if incorrectly received and decoded, will change the syndromes according to the table below.

| | $S_1$ | $S_2$ | $S_3$ | $S_4$ |
|---|---|---|---|---|
| $d_1$ rec'd correctly | 1 | 1 | 1 | 1 |
| $d_1$ rec'd incorrectly | 1 | 0 | 0 | 0 |

Note that $S_1$ did not change because it is independent of $d_1$ in its formation, as witnessed in the equation for row 1 above.

For an example, then, suppose, at the sending end (our transmitter), we have the data bits $d_1=1$, $d_2=0$, $d_3=0$, $d_4=1$. The "message," $d_1d_2d_3d_4$, is seen to be 1 0 0 1. Our communication system assumes the pedagogical form:

$$S_1 = 1 = c_1 \oplus d_2 \oplus d_3 \oplus d_4 = c_1 \oplus 0 \oplus 0 \oplus 1$$

so that $c_1$ is chosen to be 0 to satisfy this equation

Transmitter-end Encoding $$S_2 = 1 + c_2 \oplus 1 \oplus 0 \oplus 1 => c_2 = 1$$
$$S_3 = 1 = c_3 \oplus 1 \oplus 0 \oplus 1 => c_3 = 1$$
$$S_4 = 1 = c_4 \oplus 1 \oplus 0 \oplus 0 => c_4 = 0$$

Message becomes $d_1\ d_2\ d_3\ d_4\ c_1\ c_2\ c_3\ c_4$ 1 0 0 1 0 1 1 0

Assume now that the channel has an error condition imposed on it such that the disturbance erroneously inverts $d_1$ and only $d_1$. This will result in the following data and check bit string.

$d_1\ d_2\ d_3\ d_4\ c_1\ c_2\ c_3\ c_4$ 0 0 0 1 0 1 1 0

Receiver end Decoding $$S_1 = c_1 \oplus d_2 \oplus d_3 \oplus d_4 = 1$$
$$S_2 = c_2 \oplus d_1 \oplus d_3 \oplus d_4 = 0$$
$$S_3 = c_3 \oplus d_1 \oplus d_2 \oplus d_4 = 0 \quad \text{as predicted}$$
$$S_4 = c_4 \oplus d_1 \oplus d_2 \oplus d_3 = 0 \quad \text{previously}$$

Since $d_1$ being incorrect is the only way we can obtain this unique pattern of the syndromes, the only bit which can be in error is $d_1$. Correction is trivial; it merely amounts to logically inverting the $d_1$ bit (we known that the correct version of $d_1$ is merely the opposite of whatever it is now). Hence, the circuit for correcting $d_1$ is shown in FIG. 12. One obvious fact can now be underlined. For odd parity, the syndrome pattern which corrects (inverts) $d_1$ is simply the complement (logical negation) of the column in the parity check matrix corresponding to $d_1$ (the first column). And, in general, the syndrome pattern which corrects $d_1$, $d_2$, $d_3$, or $d_4$ is the complement of column 1, 2, 3, or 4. The corrections for check bits $c_1$, $c_2$, $c_3$, or $c_4$, is found as simply from the columns 5, 6, 7, or 8 in the parity check matrix, if such correction is warranted. In even parity, the syndrome is uncomplemented (complemented) if the matrix entry is a 1(0).

A double error will be signified by a syndrome pattern not found as a column in the parity check matrix and not the pattern for "no error." Thus the patterns which will signal a double error are:

$(S_1, S_2, S_3, S_4)=$ (0,0,0,0), (0,0,1,1), (0,1,0,1), (0,1,1,0), (1,0,0,1), (1,0,1,0), (1,1,0,0). Obviously, these are patterns in which two syndromes have been changed from their expected value. But it is not possible to specify the culprits: If (0,0,1,1) is received, are the culprits $d_1$ and $d_2$ or are they $c_1$ and $c_2$? Hence, by the reception of the above patterns, a double error can be recognized or detected, but no action beyond alterting the system can be taken.

The parity check matrix for the minimum circuit involves a more subtle relationship between parity over a selected byte of data and parity over a selected subset of data bits and precisely one check bit, uniquely associated with the chosen data byte. Examination of the parity check matrix shown in FIG. 9 or FIG. 10 will reveal a significant relationship. Under the encoding and decoding used (and specified by the parity check matrix), a set of 1's appears in each row, as a subset of all 1's in the row, in such a fashion that parity across all bits of one complete byte (in the data word) would be included in the formation of the syndrome corresponding to that row if the normal circuit implementation of the parity for the row was to be used. However, a dictate of the circuit technology used for a rough layout of the present translator in its inception was that any byte-size register provided byte parity, automatically, for any information loaded into it. This has not been assumed for the present implementation but it does partly explain why it is possible to include parity generation as part of the decoding process and why the same circuitry can be used for both READ and WRITE processes. The rotational parity check matrix disclosed herein basically is derived by specifying columns with only single 1 in them as check bit columns, using eight columns with three, five,..., etc., 1's in them for the section of the parity check matrix associated with the first byte, then rotating this vertically, in an ascending fashion, for each of the seven successive bytes. A discussion of the parity check matrix to be provided later will illustrate whey the rotational property is useful but not necessary for the general case of the parity check matrix formation. Precaution must be exercised to obtain a row of entire 1's for the first byte prior to the seven rotations and special care must be taken to assure that no two columns have identical patterns of 1's and 0's. This is basically how the "rotational" parity check matrix is formed. Normal correction can be used by interpreting it as a conventional parity check matrix.

Theoretical Description of the Dual Functioning of the Present Translation System The implementation and use of rotational parity codes in a memory translator, as it is presently disclosed, will now be explained. First, examine the READ process. The basic steps are:

1. Formulate a parity bit for each byte by use of the parity check matrix and data and check bits. 2. Load both data byte and parity from the MR into the MDR registers for every byte of the word. 3. Form the syndromes from the parity check on the byte parity and its parity bit (formulated in Step 1) for each data byte. 4. Determine if an error condition exists in the data read out. If the data contains no errors, gate the word out to the CPU: otherwise, correct any single error or notify the CPU of any double errors.

Each of the four broad steps above will now be amplified to permit a better understanding of the invention. Initially, the parity bit for each byte is generated by taking the parity over a selected set of data bits and precisely one check bit. Observe the first row of the rotational check matrix shown in FIG. 10. There will be eight 1's in a row in the columns corresponding to $d_1, d_2, \ldots, d_8$. There will be a single 1 in the column (first row) under $c_1$ (column 65 in an eight byte, eight bits/byte rotational parity check matrix). There will also be a set of 1's corresponding to other data bits (neither for $c_1$ nor data bits in the first byte) which are hereby defined as the first row Parity Subset. Similar comments can be made about the structure of any such row of a rotational parity check matrix. The burden of proof remains, however, to show how the parity bit is to be generated. Therefore, define the following variables:

$Y_1$—the parity over the first row parity Subset $x_1$—the parity over the first byte $p_1$—the parity bit to maintain odd parity across the first byte Note that a distinction is made here on the parity of a byte and the parity bit for the same byte. If parity (number of 1's) for a byte is even (an even number of 1's for byte data bits), the parity bit will be a 1 if odd parity is required for error detection.

The following equations derive from the above considerations for odd parity in use with a rotational parity check matrix.

$$x_1 \oplus y_1 \oplus c_1 = 1,$$

where $c_1$ is the first check bit, and $$x_1 \oplus p_1 = 1$$

By adding these equations together (addition mod 2), the sum is $$x_1 \oplus y_1 \oplus c_1 \oplus x_1 \oplus p_1 = 1 \oplus 1 = 0$$

and $$x_1 \oplus y_1 \oplus c_1 \oplus x_1 \oplus p_1 = x_1 \oplus x_1 \oplus (y_1 \oplus c_1) \oplus p_1$$

$$= p_1 \oplus (y_1 \oplus c_1) = 0.$$

Then, $$\underbrace{p_1 \oplus (y_1 \oplus c_1) \oplus (y_1 \oplus c_1)}_{0} = 0 \oplus (y_1 \oplus c_1) = y_1 \oplus c_1$$

when $y_1 \oplus c_1$ is added to both sides of the above equations. Hence, $$p_1 = y_1 \oplus c_1$$

The significance of this equation is that the parity bit for the first data byte is to be generated as the parity of the first row Parity Subset and the check bit, $c_1$ (and does not include the actual bits of the first data byte).

The outputs of this parity generation circuitry are loaded directly into the byte parity positions of the MDR. Simultaneously, with this loading of the parity bits into MDR, the data bits of all bytes are transferred from MR to MDR. This completes Step 2 above.

Once the parity bits are generated (from $y_1 \oplus c_1$) and stored, the eight data bits of each byte (with parity $x_1$) and the associated parity bit are used as inputs to a parity (or XOR) tree. Since $y_1 \oplus c_1 = p_1$ and $x_1 \oplus p_1 = 1$, the output of this parity tree, $S_1$, will be a 1 for no error in the byte. This is done to generate a set of syndrome bits: for the embodiment, there will be one syndrome from each byte and its parity bit. If, however, there is a single error in the first byte, $x_1 \oplus p_1 = 0 = S_1$ and an error condition will be signalled. This completes Step 3 above and leads into Step 4. As long as no error exists, $S_1 = S_2 = \ldots = S_8 = 1$ (for odd parity) and a signal, $NE$, can be formed as $NE = S_1 \circ S_2 \circ S_3 \circ \ldots \circ S_8$. If $NE=1$, no error exists in the data word. Hence, it is not necessary to disturb the normal routing of the word currently stored in MDR out to the remainder of the CPU. However, if $NE=0$, it becomes necessary to suspend transfer of the word, determine the type of error—single or double—and take appropriate action. A single error is generated from knowing that $NE \neq 1$ because $\overline{NE}=1$ indicates an error condition exists in the data word. But the term "error condition" does not define whether the error is single or double. To classify the error condition requires the use of one property of the parity check matrix. Any time a single data error exists, an odd number of the syndromes change. If one syndrome, and only one syndrome, changes, the error is in a check bit. It is not necessary that check bits be corrected in this translator; however, it is important that the parity bit generated by the use of the erroneous check bit be changed (inverted) to its correct value. Therefore, the need for this correction is determined and, if required, correction is performed on all parity bits by EXCLUSIVE-ORing them with the complement of the syndromes. A "One and Only One Circuit" indicates need for this correction.

As an example of this if the eight parity bits, $p_1, p_2, \ldots, p_8$ are given as $p_1=1$, $p_2=0$, $p_3=0$, $p_4=1$, $p_5=1$, $p_6=0$, $p_7=1$, $p_8=0$ and the syndromes $S_1, S_2, \ldots, S_8$ are $S_1=1$, $S_2=0$, $S_3=S_4=S_5=S_6=S_7=S_8=1$. Since $S_2=0$, this implies that the second parity bit is erroneous. To correct the parities, then, the parities are replaced by $P \oplus \overline{S}$, where $p = (p_1, p_2, \ldots, p_8)$ and $\overline{S} = (\overline{S}_1, \overline{S}_2, \ldots, \overline{S}_8)$. Then, for this example above, $$P \oplus \overline{S} = (1 \oplus 0, 0 \oplus 1, 0 \oplus 0, 1 \oplus 0, 1 \oplus 0, 0 \oplus 0, 1 \oplus 0, 0 \oplus 0) = (1, 1, 0, 1, 1, 0, 1, 0)$$

and this is the original parity bit set except that the second bit is inverted from the $p_2$ given above. It will be noted in the present embodiment on FIG. 2J that the set $\overline{S}$ is carried over to the MDR register on cables $\overline{100}, \overline{102}, \ldots, \overline{114}$.

For any other single data error, an odd number, in excess of one, of syndromes will change (there are an odd number of 1's in each column of the parity check matrix). Thus, a single error signal can be formed if:

1. the error signal is a 1 ($\overline{NE}=1$)
2. parity across the syndromes changes For the second case, it should be noted that, for eight syndromes (eight bytes, parity across the syndromes in normal, no-error operation is even, i.e., there are eight syndromes, all identically 1. However, if an odd number changes, the parity will change too to odd parity. Thus, the single error signal, SE, is formulated as $SE=\overline{NE}\ (S_1 \oplus S_2 \oplus \ldots \oplus S_8)$. $SE=1$, a single error signal exists in the data word read out of the memory. If there is an error signal ($\overline{NE}=1$) and it is not a single error ($\overline{SE}=1$), then it is a double error, $DE=\overline{NE} \wedge \overline{SE}=1$ and an alert can be sent to the CPU.

If it is possible and necessary for a correction to be made on the data bits in the MDR (single data error), the data bits are gated into the Correction Circuit by clock A-1 and back through the MR and Connection Matrix to the MDR by clock A-2 and A-3 as will be explained later. Then, the data word, with all parity bits attached can be routed to the CPU. Correction, of course, has been performed at this time as explained previously.

The WRITE process for the memory consists, broadly, of accepting a set of parity-encoded data bytes from the CPU (via the buss), checking the parity for each byte, re-encoding the data bits using the Connection Circuit, and depositing the newly re-encoded word in a register to be gated away into the memory.

To handle the first two steps of a WRITE easily and avoid complicated controls and excess data moves, the incoming word is loaded into both the MDR and MR. The word is loaded in both places with all parity bits attached. The word loaded into the MDR is put there so that the parity bits for each byte can be checked using the existing EXCLUSIVE-OR Parity check trees that are used in the READ process to generate the syndromes from the previously generated parity bits and the data bits. For WRITE, however, the information coming out of the EXCLUSIVE-OR trees for each byte is or should be a set of 1's indicating that parity is satisfied for each byte or 0's in those parity positions in which byte parity is not correct for the associated byte. If parity is not correct, retransmission of the information will be required. However, if no error is indicated, then the word is ready to be re-encoded and put into memory.

The word that is to be re-encoded for storage is in the MR. (Otherwise, the word in the MDR would have to be moved to the MR and checking parity on it is not as effective.) Once the MDR version of the word is pronounced fit for storage, the check bits for the newly re-encoded form can be generated using the circuitry provided to implement the parity check matrix for a READ. The data bits and parity bits obey these equations $$x_1 \oplus y_1 \oplus c_1 = 1$$

$$x_1 \oplus p_1 = 1$$

shown previously for the case of the first row of the parity-check matrix in a READ. Once again, similar considerations apply for the other rows and data bytes.

Specifically, the above equations can be rearranged to show that check bits can be generated from data and parity bits. From above developments, the equations shown are rearranged to give $$p_1 \oplus y_1 \oplus c_1 = 0$$

For the READ case, this equation was rearranged to $c_1 \oplus y_1 = p_1$. For the WRITE case, the equation is rearranged to give $P_1 \oplus Y_1 = c_1$. This equation represents what is carried out on the word in the MR. The parity bit for each byte and the Parity Subset denoted by $y_1$ in the equation above for the first byte, are EXCLUSIVE-ORed together to provide the check bits required by the data bits in each byte prior to storage. The check bits are then physically stored in the parity bit position in the MDR. Once the check bits are generated, the word (data and check bits) can be removed from the MR, into which they have been loaded from the MDR during the re-encoding phase of the WRITE process, and stored.

The Formation of the Connection Matrix from the Parity Check Matrix

Figure 10:
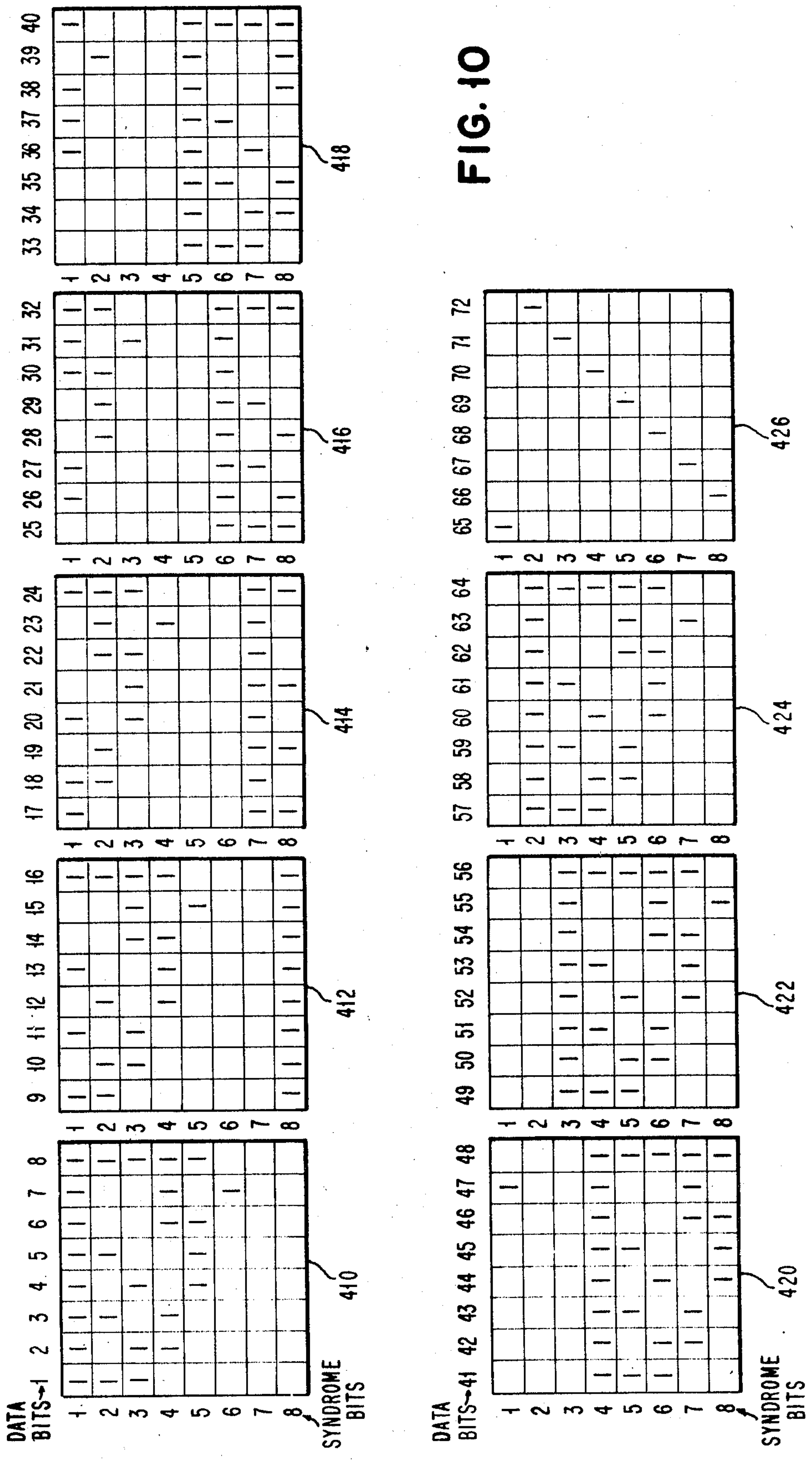
FIG. 10 comprises the parity check matrix of FIG. 9 shown in all of its rotational phases which is utilized to specify the actual connection of the parity check matrix shown on FIG. 1A.

The following description of the basic parity matrix 9 and the full parity check matrix of FIG. 10 developed therefrom specifically describes the manner in which the Connection Matrix is shown both on FIG. 1 and 2 is formed. The theoretical discussion of the reasons such a check matrix must be utilized if the desired dual function circuitry is to be achieved and the way it is generated has just been described. The following discussion merely illustrates the particular use of a particular matrix having the desired properties suitable for use with the present embodiment.

Figure 1B:
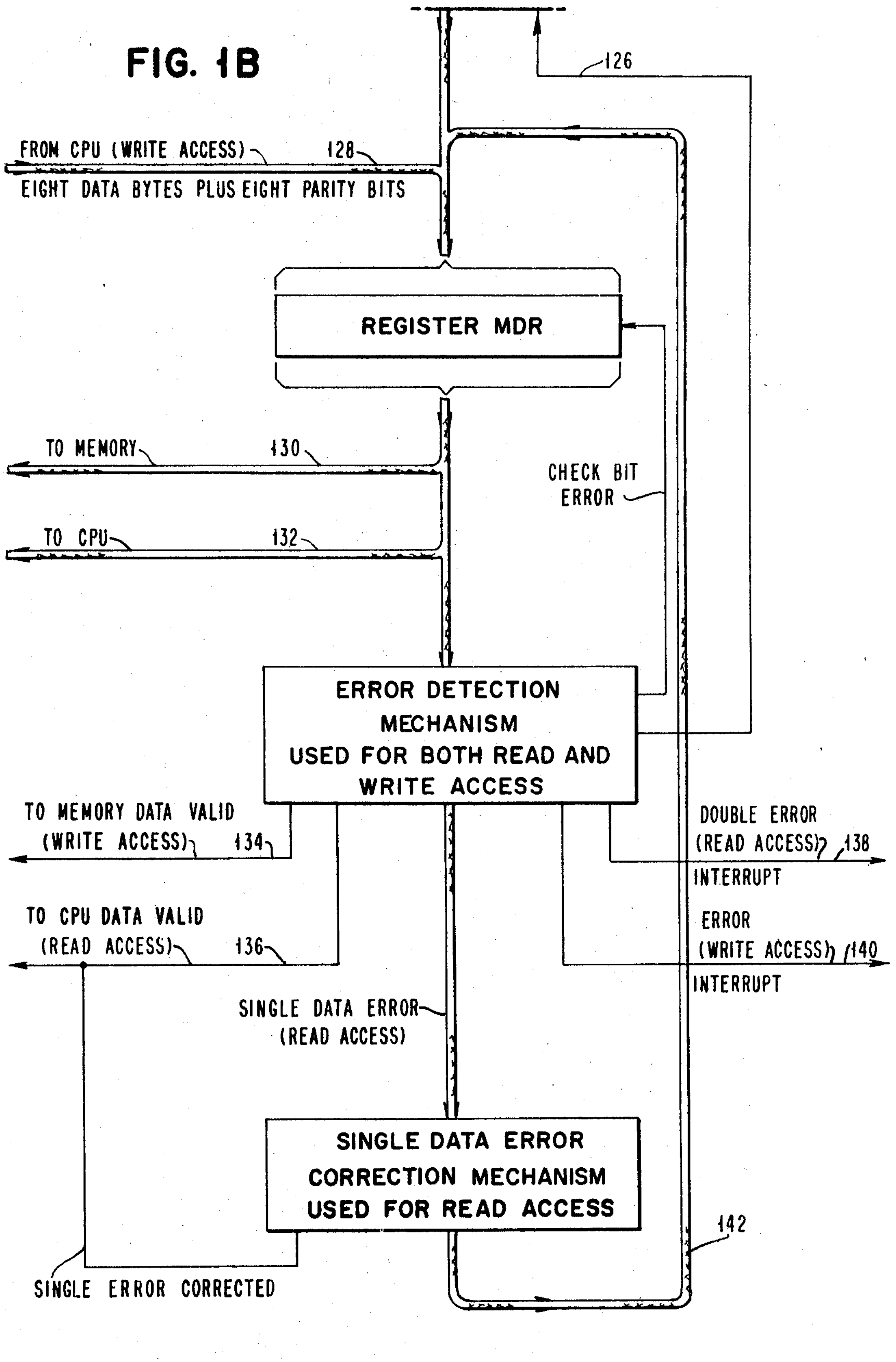

To form the Connection Matrix referred to on FIGS. 1A & 1B and shown in detail on FIGS. 2A, 2B, 2C and 2D, the following procedure is used. Referring to FIG. 9, a matrix is first constructed having eight columns and eight rows. This matrix is then copied to the rectangle 410 on FIG. 10.

This does not mean that the top row of all "1's" is not important in understanding the mathematical rules that underlie this invention. For the specific purpose of constructing the interconnection matrix referred to above, the top row of "1's" is disregarded.

On FIG. 10, the rightmost rectangle 426 indicates the location of the check bits. To form the matrix shown in the rectangle 412 shown on FIG. 10, the matrix on rectangle 410 is rotated upwardly. In other words, the first row is replaced by the second row, the second row is replaced by the third row and so on. The top most or first row goes to the bottom or the eighth row. The matrix shown in the rectangle 414 is the matrix of the rectangle 412 again rotated once vertically upwards as described before. The rectangle containing the matrix 416 is formed by rotating the matrix in the rectangle 414 once upwardly and so on in the same manner and constructing the matrices shown in rectangles 418, 420, 422 and 424. Thus, the matrix of the rectangle 412 is the matrix of 410 rotated once. The matrix in rectangle 414 is the matrix of 410 rotated twice. The matrix in rectangle 416 is the matrix 410 rotated three times. The matrix in rectangle 418 is the matrix 410 rotated four times. The rectangle 420 contains the matrix of 410 rotated five times. The matrix in 422 is the matrix of 410 rotated six times. The matrix in rectangle 424 is the matrix of 410 rotated seven times.

Considering next the nine rectangles on FIG. 10 labeled 410–426 inclusive as a single matrix of eight rows and 72 columns, it will be seen that this matrix corresponds to the configuration on FIGS. 2A, 2B, 2C and 2D. The 72 columns on FIG. 10 correspond to the 72 bits in the Register MR on the same figures. The eight rows on FIG. 10 correspond to the eight cables 204 through 218 inclusive on the figure. Still on the FIG. 10, it will be noted that each row contains 19 "1's." Each "1" in a row of the matrix corresponds to the "1" output of the same numbered flip-flop of the MR Register. For example, the first "1" appearing in row No. 1 is column No. 9. On FIG. 2A, it will be noted that the "1" output of flip-flop No. 9 is the first input to cable 204. The remainder of the connections of cable 204 are made by referring to the matrix, thus bits 11, 13 17, 18, etc. are all connected to cable 204. The connections of the other cables are selected in exactly the same way by referring to the rows of the matrix of FIG. 10.

Methods of Constructing Parity Check Matrices

The following is a general discussion of how a parity check matrix would be constructed where there are a different number of bytes (byte parity bits) and check bits. If there are $m$ bytes of $b$ bits, then there are $mb=K$ data bits. Given $K$, the usual Hamming relationship set forth in the previously referenced book of W. W. Peterson, "Error Correcting Codes," determines the number of check bits $r$. All parity check matrices will have $K+r$ columns and $r$ rows. The last $r$ columns will have one 1 and $(r-1)$ 0's arranged so the columns have a 1 in the first, second, . . . , $r$th row. Each column corresponds to a check bit.

Divide the $m$ bytes evenly into $r$ sets $T_1$. If $m=dr+e$ $0 \leq e<r$ put $d+1$ bytes into the first $e$ sets $T_1, \ldots, T_e$ and $d$ bytes into the last $(r-e)$ $T_{e+1}, \ldots, T_r$. Let set $T_i$ correspond to the $i^{th}$ check bit and the $i^{th}$ row. Begin by putting $b(d+1)$ into the first row under $T_1$, $b(d+1)$ 1's into the second row under $T_2$, and continue for the first $e$ sets. Now put $bd$ 1's into the $(e+1)^{st}$ row under the set $T_{e+1}$, and continue until under each set there are $b(d+1)$ or $bd$ 1's each in a separate row. (In FIG. 1, rows 1 to 8 and in FIG. 4 rows 1 to 7 with eight bits on row 1, four on the rest.)

There are $$\binom{r}{3}=r\frac{(r-1)(r-2)}{6}$$

different ways of placing three 1's in $r$ places and $$\frac{(r-1)(r-2)}{2}$$

combinations of three 1's with a 1 in a particular row. Use all of the combination of three bits, since the fewer 1's there are in parity check matrix, the fewer the connections and the fewer XOR circuits used.

For $r=7$ there are 35 such combinations possible and 32 for FIG. 4 are needed. A possible choice is shown in FIG. 4. If more than $\binom{r}{3}$ are needed, then there are $$\binom{r}{5}=\frac{r(r-1)(r-2)(r-3)(r-4)}{120}$$

possible choices with five 1's, $\binom{r}{7}$ with seven, $\binom{r}{9}$ with nine and so on.

It is best to choose the 1's so that the number in each row is balanced so the circuit delays are approximately equal. One way is to make one choice—say, column 1 in TABLE I, then rotate the choice through all the bytes, then make a second and rotate it, etc. Care must be taken to make these all distinct. Choose the last ones by picking from what is left and moving columns if necessary.

Example 1: $m<r$

The example with two bytes and six check bits in TABLE II will help clarify the following statements.

a. For the cases in which a check bit is formed using all the data bits in a byte ($c_1$ and $c_4$ in the example), form the parity bit and the syndrome bit as before.
b. Form the other syndrome bits as usual, e.g., take the XOR of the proper subset of data bits for each check bit ($s_2$,$s_{3a8}$'$s_5$,$s_6$ in the example).
c. Form the error signals and perform the correction, if necessary, just as before using the syndrome and parity bits.
d. Once again, the number of bits in a byte are arbitrary. See the example in TABLE III with four bit bytes and six check bits.

Example 2: $m>r$

Figure 11:
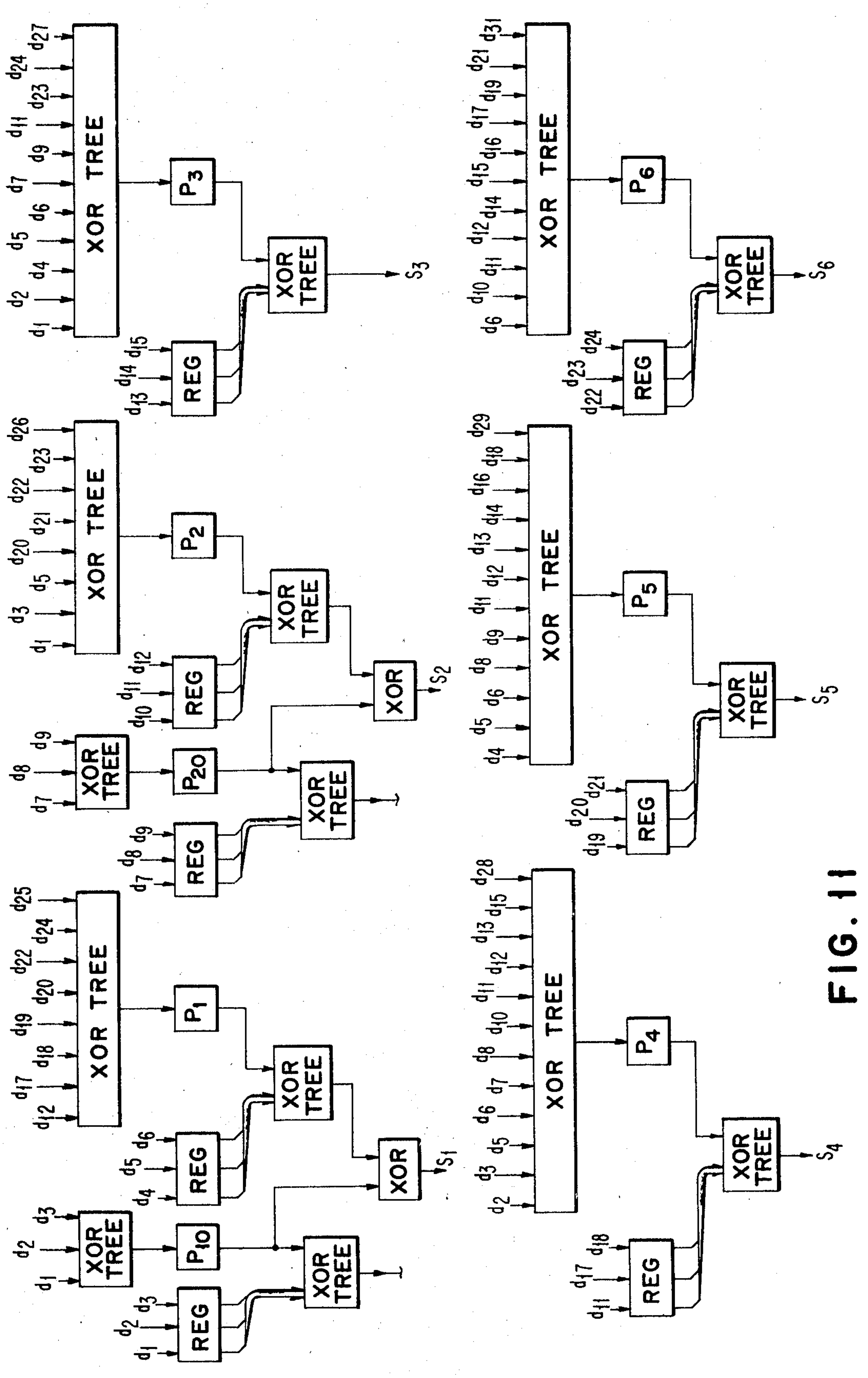
FIG. 11 comprises a logical schematic diagram of the syndrome generation circuitry necessary with a case where the number of bytes and check bits is different.

In this case, every check bit will correspond to a set of data bits, and each set of data bits will contain one or more whole bytes. TABLE IV and FIG. 11 shows one example of this case, including the circuitry required to implement the syndromes from subsets of data bits as dictated by the parity check matrix.

a. Follow the procedures as before to get a parity bit for the whole set using one check bit and the translator.
b. Split each set containing $n$ (two or more) bytes into $n$ parts. Generate $n$-1 parity bits for the first $n$-1 bytes and use this parity bit for the byte parity check. The $n$th byte will use the original parity bit.
c. Form the XOR of the generated parity bits and the $n$th parity check (the one using the parity bit formed from translation) to get the syndrome bit corresponding to the check bit.
d. Perform all error signals and corrections using the syndrome bits and the equations used before.
e. Once again, any number of bits can form a byte, as shown in the example above using three bit bytes.

TABLE I $m=8, b=4, k=8\times4=32, r=7$ $8=7\times1+1$

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 0 | 0 | 0 | 0 | 0 | 0 | 0 | 0 | 0 | 0 | 0 | 1 | 0 | 1 | 0 | 0 | 1 | 1 | 0 | 0 | 1 | 0 | 1 | 0 | 1 | 0 | 0 | 0 | 0 | 0 | 0 |
| 1 | 0 | 1 | 0 | 1 | 0 | 0 | 0 | 1 | 1 | 1 | 1 | 0 | 0 | 0 | 0 | 0 | 0 | 0 | 0 | 0 | 0 | 1 | 1 | 0 | 1 | 1 | 0 | 1 | 1 | 0 | 1 | 0 | 1 | 0 | 0 | 0 | 0 | 0 |
| 1 | 1 | 0 | 1 | 0 | 0 | 0 | 0 | 1 | 0 | 1 | 0 | 1 | 1 | 1 | 1 | 0 | 0 | 0 | 0 | 0 | 0 | 0 | 0 | 0 | 0 | 0 | 1 | 0 | 1 | 1 | 0 | 0 | 0 | 1 | 0 | 0 | 0 | 0 |
| 0 | 1 | 1 | 0 | 0 | 1 | 1 | 0 | 1 | 1 | 0 | 1 | 1 | 0 | 1 | 0 | 1 | 1 | 1 | 1 | 0 | 0 | 0 | 0 | 0 | 0 | 0 | 0 | 0 | 0 | 0 | 1 | 0 | 0 | 0 | 1 | 0 | 0 | 0 |
| 0 | 0 | 0 | 1 | 1 | 1 | 0 | 1 | 0 | 1 | 1 | 0 | 1 | 1 | 0 | 1 | 1 | 0 | 1 | 0 | 1 | 1 | 1 | 1 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 1 | 0 | 0 | 0 | 1 | 0 | 1 | 1 | 0 | 1 | 1 | 0 | 1 | 1 | 0 | 1 | 0 | 1 | 1 | 1 | 1 | 0 | 0 | 0 | 0 | 0 | 0 | 0 | 0 | 0 | 1 | 0 |
| 0 | 0 | 0 | 0 | 0 | 0 | 1 | 0 | 0 | 0 | 0 | 0 | 0 | 0 | 0 | 1 | 0 | 1 | 1 | 0 | 1 | 1 | 0 | 1 | 1 | 0 | 1 | 1 | 1 | 1 | 1 | 1 | 0 | 0 | 0 | 0 | 0 | 0 | 1 |

TABLE II $k=16,\ r=6,\ n=22,$ 2 bytes

| | $d_1$ | $d_2$ | $d_3$ | $d_4$ | $d_5$ | $d_6$ | $d_7$ | $d_8$ | $d_9$ | $d_{10}$ | $d_{11}$ | $d_{12}$ | $d_{13}$ | $d_{14}$ | $d_{15}$ | $d_{16}$ | $c_1$ | $c_2$ | $c_3$ | $c_4$ | $c_5$ | $c_6$ |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Parity, $s_1$ | 1 | 1 | 1 | 1 | 1 | 1 | 1 | 1 | 0 | 1 | 0 | 0 | 1 | 0 | 0 | 0 | 1 | 0 | 0 | 0 | 0 | 0 |
| Connection, $s_2$ | 1 | 1 | 1 | 1 | 0 | 0 | 0 | 0 | 0 | 0 | 1 | 0 | 0 | 1 | 0 | 1 | 0 | 1 | 0 | 0 | 0 | 0 |
| Matrix: | | | | | | | | | | | | | | | | | | | | | | |
| $s_3$ | 1 | 0 | 0 | 0 | 1 | 1 | 1 | 0 | 0 | 0 | 0 | 1 | 0 | 0 | 1 | 1 | 0 | 0 | 1 | 0 | 0 | 0 |
| $s_4$ | 0 | 1 | 0 | 0 | 1 | 0 | 0 | 0 | 1 | 1 | 1 | 1 | 1 | 1 | 1 | 1 | 0 | 0 | 0 | 1 | 0 | 0 |
| $s_5$ | 0 | 0 | 1 | 0 | 0 | 1 | 0 | 1 | 1 | 1 | 1 | 1 | 0 | 0 | 0 | 0 | 0 | 0 | 0 | 0 | 1 | 0 |
| $s_6$ | 0 | 0 | 0 | 1 | 0 | 0 | 1 | 1 | 1 | 0 | 0 | 0 | 0 | 0 | 0 | 0 | 0 | 0 | 0 | 0 | 0 | 1 |

TABLE III $k=16, r=6, n=22,$ 4 bytes

| | $d_1$ | $d_2$ | $d_3$ | $d_4$ | $d_5$ | $d_6$ | $d_7$ | $d_8$ | $d_9$ | $d_{10}$ | $d_{11}$ | $d_{12}$ | $d_{13}$ | $d_{14}$ | $d_{15}$ | $d_{16}$ | $c_1$ | $c_2$ | $c_1$ | $c_4$ | $c_5$ | $c_6$ |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| $S_1$ | 1 | 1 | 1 | 1 | 0 | 0 | 0 | 0 | 0 | 1 | 1 | 0 | 1 | 0 | 1 | 0 | 1 | 0 | 0 | 0 | 0 | 0 |
| $S_2$ | 1 | 1 | 0 | 0 | 1 | 1 | 1 | 1 | 0 | 0 | 0 | 0 | 0 | 1 | 1 | 0 | 0 | 1 | 0 | 0 | 0 | 0 |
| $S_3$ | 1 | 0 | 1 | 1 | 1 | 1 | 0 | 1 | 0 | 0 | 0 | 1 | 0 | 0 | 0 | 1 | 0 | 0 | 1 | 0 | 0 | 0 |
| $S_4$ | 0 | 1 | 1 | 0 | 1 | 0 | 1 | 0 | 1 | 1 | 1 | 1 | 0 | 0 | 0 | 0 | 0 | 0 | 0 | 1 | 0 | 0 |
| $S_5$ | 0 | 0 | 0 | 0 | 0 | 1 | 1 | 0 | 1 | 1 | 0 | 0 | 1 | 1 | 1 | 1 | 0 | 0 | 0 | 0 | 1 | 0 |
| $S_6$ | 0 | 0 | 0 | 1 | 0 | 0 | 0 | 1 | 1 | 0 | 1 | 1 | 1 | 1 | 0 | 1 | 0 | 0 | 0 | 0 | 0 | 1 |

TABLE IV

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 31 | |
|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 0 | 0 | 0 | 0 | 0 | 1 | 0 | 0 | 0 | 0 | 1 | 1 | 1 | 1 | 0 | 1 | 0 | 1 | 1 | 0 | 0 | 0 | 0 | 0 | 1 |
| 1 | 0 | 1 | 0 | 1 | 0 | 1 | 1 | 1 | 1 | 1 | 1 | 0 | 0 | 0 | 0 | 0 | 0 | 0 | 1 | 1 | 1 | 1 | 0 | 0 | 1 | 0 | 0 | 0 | 0 | 2 |
| 1 | 1 | 0 | 1 | 1 | 1 | 1 | 0 | 1 | 0 | 1 | 0 | 1 | 1 | 1 | 0 | 0 | 0 | 0 | 0 | 0 | 0 | 1 | 1 | 0 | 0 | 1 | 0 | 0 | 0 | 3 |
| 0 | 1 | 1 | 0 | 1 | 1 | 1 | 1 | 0 | 1 | 1 | 1 | 1 | 0 | 1 | 1 | 1 | 1 | 0 | 0 | 0 | 0 | 0 | 0 | 0 | 0 | 0 | 1 | 0 | 0 | 4 |
| 0 | 0 | 0 | 1 | 1 | 1 | 0 | 1 | 1 | 0 | 1 | 1 | 1 | 1 | 0 | 1 | 0 | 1 | 1 | 1 | 1 | 0 | 0 | 0 | 0 | 0 | 0 | 0 | 1 | 0 | 5 |
| 0 | 0 | 0 | 0 | 0 | 1 | 0 | 0 | 0 | 1 | 1 | 1 | 0 | 1 | 1 | 1 | 1 | 0 | 1 | 0 | 1 | 1 | 1 | 1 | 0 | 0 | 0 | 0 | 0 | 1 | 6 |

Description of the Disclosed Embodiment of FIGS. 2A–2J

At point it is assumed that the reader is familiar with the previous general descriptions of the operation of the system with respect to the description of FIGS. 1 and 3–11 as well as familiar with the theoretical considerations such as the design of the multifunction Connection Matrix and more particularly as to how it is constructed from the parity check matrix. The following description is for the purpose of specifying just how data is gated from the initial input register MR down through the Connection Matrix into the register MDR. Further the data flow and circuit components utilized in generating the syndrome bits, distinguishing between different types of error conditions and finally the circuitry responsible for making data bit corrections. It should of course be clearly understood that the present embodiment is intended to be exemplary only in that many changes in the form and details of the particular hardware, the gating arrangements, timing components, testing mechanisms, etc. could readily accomplished by a person skilled in the art without departing from the spirit and scope of the present invention as will be set forth in the pending claims.

Although the specific embodiment is actually comprised of the composite of FIGS. 2A–2J, whenever general reference is made to the figure, it will simply be called FIG. 2 for the sake of convenience. However, in certain instances when referring to specific circuitry the particular figure will be set forth.

Referring now to the disclosed embodiment, the MR register is shown appearing across the top of FIG. 2 and specifically extends across FIGS. 2A, 2B, 2C and 2D. It is assumed that gating means are provided in the memory and the CPU to load this register although these are not shown specifically. In this register, bits numbering 1–64 are used for the eight data bytes of eight bits each and the bits 65–72 are used for the eight check bits. The Connection Matrix also specifically shown on FIG. 1 is implemented in the embodiment of FIG. 2 by the eight cables numbered 204, 206, 208, 210, 212, 214, 216 and 218. Each of these cables has 19 inputs from the MR register as explained previously. Eighteen of these inputs are from the data bits and one is from the check bits. Each of the cables just mentioned is applied to an EXCLUSIVE OR tree circuit. There are eight of these EXCLUSIVE OR tree circuits labeled 172–186 inclusive. As mentioned previously, the details of one of the 19 input EXCLUSIVE OR trees is shown on FIG. 7. The eight data bytes of eight bits each in the MR register are applied to the eight gates 188 through 202 inclusive. These eight gates correspond to gate 124 on FIG. 1A, and are all enabled by a CR-1, CW-1 or A-3 signal applied to OR-gate 125 which in turn produces an output on wire 126. The outputs of the EXCLUSIVE OR trees 172–186 inclusive are also applied to the gates 188–202 inclusive. Referring now to the right hand portion of FIG. 2D, the wire 156 produces the parity bit for a byte number symbol 1. The wire 158 produces the parity bit for byte No. 8. The wire 160 produces the parity bit for byte No. 7. The wire 162 produces the parity bit for byte No. 6. The wire 164 produces the parity bit for byte No. 5. The wire 166 produces the parity for byte No. 4. The wire 168 produces the parity bit for byte No. 3 and the wire 170 produces the parity bit for byte No. 2. As was explained previously, the connections of the Connection Matrix relative to the specific data and check bits is directly determinable from the rotational parity check matrix shown on FIG. 10 and generally described previously. During a read access the CR clock is started shortly after the MR register is loaded. The CR-1 pulse is applied through an OR circuit 125 to wire 126 in order to ingate the MDR register and also to gate 340 in order to ingate the register *S* shown on FIG. 2J which is utilized to store the syndrome bits. The register MDR is made up of eight sections of nine bits each. Each section contains eight data bits and one parity bit. Each nine-bit section is applied to one of the EXCLUSIVE OR trees 222–236 inclusive. These inclusive OR trees are similarly to the detailed EXCLUSIVE OR tree illustrated in FIG. 7 except that they have nine inputs instead of the 19 shown in FIG. 7. The eight outputs of the just mentioned EXCLUSIVE OR circuits are utilized to set the eight syndrome bits in the register *S* shown on FIG. 2J.

From CR-1 the clock advances to CR-2. The CR-2 pulse is used to test to see whether or not there is an error. If odd parity is used, a no error condition is indicated when all of the *S* bits are 1. In other words on FIG. 2I, line 238 will be active if there is no error and line 240 will be active if there is an error. This is true because the AND circuit 237 will be enabled by all ones appearing in the *S* register as will be readily understood. The CR-2 pulse is applied to gate 242 still on FIG. 2I in order to test the condition of wires 238 and 240. If there is no error, the clock will branch to CR-4 via wire 396. This in effect will tell the system to send the data appearing in the MDR register out to the CPU or elsewhere in the system since no error is present. If there is an error, however, the clock will branch to CR-3 via wire 398. Wires 396 and 398 are also shown on FIGS. 6 where they effect the just mentioned branching of the CR clock sequence. If line 240 is active, it necessarily indicates the presence of an error and it is next necessary to test to see if the error is a single error or not. This is done by the clock pulse CR-3 which is applied to gate 244 on FIG. 2I in order to make this test. If there is a single error, the ECLUSIVE OR tree 246 will have a "1" output. This is because an odd number of ones will be present in the *S* register in the case of a single error. The AND circuit 248 will have an output because line 240 is active. If AND circuit 248 has an output at the time the CR-3 pulse is applied to gate 244, the clock will branch to CR-6 via the wire 400. This implies a single error. If AND circuit does not have an output at the time that the CR-3 pulse is applied to gate 244, the clock will branch to stage CR-5 via wire 402. Wires 400 and 402 are also shown on the CR clock circuit on FIG. 6. The clock pulse CR-5 causes a system interrupt. This is because a double error has been detected and it is not possible to make a correction. Accordingly, some other mechanism provided by the operating system must be called into play at this time. However, this has no bearing on the present invention. Assuming now that line 400 was active, clock step CR-6 is activated which initiates the correction procedure.

What must now be determined is whether or not the single error was a check bit error requiring only correction of the specific check bit involved which must be performed as a parity bit correction back in the MDR Register or a single data bit error. This is done by applying clock pulse CR-6 to the gate 405 on FIG. 2J. It will be noted that the one out of eight logic circuit 407 shown on FIG. 2J is connected to the zero side of the *S* Register. It will be remembered that a single syndrome bit error indicates check bit is incorrect and that 3, 5 or 7 syndrome bit errors implies a single data bit error. Hence, if the logic block 407 produces an output, it will mean that a check bit error has been diagnosed activating line 354 and initiating the clock pulse CR-7. It will be noted that this clock pulse is applied to the line 254 in FIG. 2E, 2F, 2G and 2H. It will be noted that this clock pulse is gated into each of the gates such as 255 appearing below each of the bit storage locations of the MDR Register. The function of the pulse is to EXCLUSIVE OR the complement contents of the *S* Register with the contents of the parity bit storage location of the MDR Register. This is done with the EXCLUSIVE OR circuit such as 257. The outputs of the EXCLUSIVE OR circuit then pass through the gate circuits 255 and in effect any parity bit stored in the parity bit storage location of the MDR Register will be changed via the just described circuitry on the initiation of a clock pulse CR-7 provided that the associated syndrome bit for that particular byte parity is set at a "0." Thus, by way of example, referring to byte 1 storage location of the MDR Register appearing in the left-hand portion of FIG. 2E, assume that the parity bit is set to a "1." Assume also that the syndrome bit position 1 has indicated a check bit error in this location thereby activating the line $\overline{\mathbf{100}}$. This being the case there will be no output from the EXCLUSIVE OR circuit 257 which in turn will produce an output from the inverter 259 which signal will pass through the gate circuit 255 on the occurrence of a clock pulse CR-7, and will reset the bit location through OR circuit 261 to "0." In all those parity bit locations where the corresponding syndrome bit in the *S* Register is a "1," the parity bit will not be changed by the just described circuitry on the application of the clock pulse CR-7.

Assuming now that a single error is detected and the correction is to made, line 404 is activated by applying the clock pulse CR-6 to gate 405. The activation of line 404 initiates the A clock shown on FIG. 8. As stated previously, this is a simple three stage clock which directly gates the data bits via A-1 currently stored in the MDR Register over the cable 312 into the correction circuitry shown in the bottom portion of FIG. 2J. Clock pulse A-2 then transmits the corrected data stored in the register 500 into the MR Register. This is necessary because a number of the parity bits generated during the preceding cycle will be incorrect (i.e., 3, 5 or 7). The turnoff of A-2 initiates A-3 which is applied to OR circuit 125 to gate the contents of the MR register through the Connection Matrix on EXCLUSIVE OR trees to produce now correct parity bits. The turnoff of A-3 initiates CR-4 which signals that the data currently in the MDR Register is now ready for transmission to the CPU.

The disclosed correction circuitry comprises an AND-gate 502 for each data bit and also an EXCLUSIVE OR 504 for receiving the original data bit from the MDR Register an EXCLUSIVE ORing it with the output of the AND circuit 502. This sort of a correction technique is well known in the art and is discussed and described in a number of articles and publications, for example, the W. W. Peterson reference or the original Hamming paper cited. It is noted generally that the inputs to the various AND circuits are taken from the syndrome bits stored in the *S* Register and applied in either their original or inverted form to provide the required correction logic. In the disclosed correction circuit, all data bits, i.e., $d_1$–$d_{64}$ are dumped into the correction circuitry in parallel and are essentially corrected in parallel via the A clock.

When the correction is completed, the register 500 will then be loaded with the correct data after which the occurrence of the clock pulse A-2 will load this corrected data into the MR Register and through the Connection Matrix into the MDR by clock pulse A-3.

The above description of the correction circuitry completes the description of a memory read access. Next a write access will be described, it being remembered that FIGS. 3 and 4 describe the process and also the CW clock which controls the system during a memory write cycle. It will be remembered that prior to a write cycle, both the MR and the MDR Registers are located with both data and parity bits appearing on the line from the CPU. But first a check must be made to see if the parity is correct on the received data in the MDR Register. This done by applying the clock pulse CW-1 on line 145 to ingate the *S* Register through the EXCLUSIVE OR circuits 222–236. As described previously, this merely performs a parity check and assuming odd parity is present, the *S* Register should now contain all ones. The turnoff of CW-1 initiates CW-2 is applied to line 148 on FIG. 2I and tests the contents of the *S* Register for correct parity or all ones by examining the output of the AND circuit 237. If line 238 is active, it indicates that the *S* Register was truly set to all ones and no error is present which initiates clock pulse CW-4. If on the other hand, a parity error is detected, this branches the system to clock pulse CW-3 which will signal the system that a parity error has been detected and that the data must be retransferred into the MR and MDR registers.

Assume that no error has occurred and that line 149 on FIG. 2I is activated. This line then actuates the clock stage CW-4 which is applied via line 126 through OR circuit 125 to gate the contents of the MR Register through the Connection Matrix to generate the required check bits and store them in the appropriate check bit storage locations of the MDR Register. It will be noted that line 126 emanates from the OR circuit 125 on FIG. 2D. The turn off of CW-4 initiates clock stage CW-5 which in effect sends a "data valid" write memory signal to the memory whereby the entire contents of the MDR Register which now contains the correct data bits and also the generated check bits are sent to the memory where they will be appropriately stored.

This completes the description of the write access for the system and thus completes the overall description of the disclosed embodiment of FIG. 2.

As stated previously, many changes in modifications could be made in the details of the disclosed embodiment without departing from the broad teachings of the present invention. Also, the particular check code, word size and obviously the parity check matrix could also be changed. In the present example, there are a total of 64 bits broken up into eight bytes of eight bits each together with eight check bits for a Hamming code having the desired properties of single error correction and double error detection. As was apparent in the previous discussion of Hamming codes, the situation can certainly arise wherein the particular byte size and the number of bits per byte may be such in a given instance that the number of byte parity bits will differ from the number of check bits and thus syndrome bits. In this situation the Connection Matrix can still be utilized for the purpose of generating the parity bits that are necessary and also the same number of syndrome bits. However, for additional syndrome bits special purpose circuitry just for that purpose must be dedicated. Accordingly, it would be appreciated that the ultimate utilization of the present invention is in a system where there are the same number of syndrome bits and byte parity bits for ultimate utilization of the dual function circuitry.

In conclusion, the present system provides for the translation from SEC/DED code to byte parity. It provides for the translation from byte parity to SEC/DED code using the same set of EXCLUSIVE OR trees and Connection Matrix. Further, circuitry provides for byte parity checking to analyzed data received from the CPU or elsewhere in the system which is to be ultimately read into memory and for the single bit error correction may be performed by conventional correction circuitry utilizing the original data bits and various combinations of the generated syndrome bits, and further the system controls only require that the correction routine be carried out when an actual single data bit error is detected. The invention thus results in a highly reliable memory system incorporating SEC/DED correction capabilities utilizing little more circuitry than would be necessary if only parity checking would be provided for.

While the invention has been particularly shown and described with reference to a preferred embodiment thereof, it will be understood by those skilled in the art that various changes in form and details may be made therein without departing from the spirit and scope of the invention.

What is claimed is:

1. A data translation circuit means for use with single error correction-double error detection Hamming coded data for examining Hamming coded data from an associated memory and placing same on a system bus in byte parity coded form and for examining byte parity coded data received from the system bus and for storing said data in said memory in single error correcting-double error detecting Hamming coded form, said system comprising:

storage means for selectively storing data bits and check bits on a memory read access and for storing data bits and byte parity bits on a memory write access, connection matrix means for selectively sampling predetermined bits in said storage means, first EXCLUSIVE OR tree circuit means connected to the output of said connection matrix means for producing special purpose bits, storage means for storing the original data bits and the special purpose bits from said first EXCLUSIVE OR tree means, second EXCLUSIVE OR tree circuit means for examining the parity across the special purpose bits and associated data byte, register means for storing the results of said second EXCLUSIVE OR tree output, wherein all said results should be of a predetermined binary state if the correct parity relationship exists across all of the data bytes and their associated special purpose bits, and means for examining the results of said second EXCLUSIVE OR tree operation and means for signaling an appropriate error when the input data is received from the system bus and for signaling a data or check bit error when the input data originated in the associated memory.

2. A data translation system as set forth in claim 1 wherein the output of the second EXCLUSIVE OR tree means should be a series of binary bits of the same binary value where the proper parity relationship exists across each data byte and its associated special purpose bit.

3. A data translation system as set forth in claim 2 wherein said examining means includes means for signalling a parity error if an error is detected during a memory write access and means for signaling a memory output error and specifying a single check bit error, a single data bit error, or a double error during a memory read access.

4. A data translation system as set forth in claim 1 wherein said connection matrix and first EXCLUSIVE OR tree circuit means is operative to selectively generate byte parity bits from the data bits and Hamming code bits on a memory read access or Hamming code check bits from he data bits and byte parity bits on a memory write access.

5. A data translation system as set forth in claim 4 wherein said connection matrix comprises a plurality of cables connected to predetermined bits in said storage means, the particular connections being determined from a parity check matrix and there being as many cables as special purpose bits to be generated, wherein said generated special purpose bits comprise byte parity bits on a memory read access and Hamming code check bits on a memory write access.

6. A data translation system as set forth in claim 5 wherein said connection matrix is connected and the parity check matrix is selected so that no cable of said connection matrix is connected to the same pattern of bits in said storage means as any other cable.

7. A data translation system as set forth in claim 6 wherein said first EXCLUSIVE OR tree circuit means comprises a plurality of EXCLUSIVE OR circuit trees each being connected to a single output cable from said connection matrix.

8. A data translation system as set forth in claim 7 wherein said second EXCLUSIVE OR circuit tree means comprises a plurality of EXCLUSIVE OR circuit trees each connected to said storage means so that it examines all of the bits of a particular data byte and an associated special purpose bit.

9. A data translation system as set forth in claim 5 wherein said storage means comprises first and second data register means the output of the first data register means being connected to the input of said connection matrix and thence to the input of said first EXCLUSIVE OR circuit tree means and wherein the output of said second data register means is connected to the input of said second EXCLUSIVE OR circuit tree means.

10. A data translation system as set forth in claim 5 including means for gating data bytes and byte parity bits directly into both the first and second data register means on a memory write access and means for gating said data and parity bits from the second data register means through said second EXCLUSIVE OR circuit tree means for examining the byte parity of said received data.

11. A data translation system as set forth in claim 10 including means operable upon a successful parity examination to gate the data bits and parity bits received from the system bus from the first data register means through the connection matrix and the first EXCLUSIVE OR circuit tree means to generate the SEC/DED Hamming code check bits from the data bits and byte parity bits and, means for gating said data bits and generated check bits to the memory for storage.

12. A data translation system as set forth in claim 5 wherein said special purpose bits comprise byte parity bits where the input to the connection matrix and the first EXCLUSIVE OR circuit tree means comprise data bits and check bits on a memory read access, and means for changing a generated byte parity bit when the examining means detects a single check bit error from the output of the second EXCLUSIVE OR circuit tree means, the parity bit changed being the one directly connected to that portion of said second EXCLUSIVE OR circuit tree means which caused an error signal to occur.

13. A data translation system as set forth in claim 12 wherein the output of said second EXCLUSIVE OR operation comprises Hamming code syndrome bits, means for examining the number of syndrome bits in error and means responsive to said last named means for indicating a single check bit error if only one syndrome bit is in error indicating a single data bit error if an odd number of syndrome bits greater than one is in error, or for indicating a double error if an even number of syndrome bits are in error.

14. A data translation system as set forth in claim 13 including means responsive to said last-named indicating means upon a determination that a single data bit error is present to gate the data bits and syndrome bits to the correction circuit means and means for gating the data bits from the correction circuit means back to said storage means without changing the Hamming code check bits currently stored therein.

15. A data translation system as set forth in claim 14 including means for generating new byte parity bits after said data bits have been corrected and returned to said storage means from said correction circuit means, said means including means for gating said corrected data bits and said unaltered check bits previously stored therein through said connection matrix and said first EXCLUSIVE OR circuitry means.